US012282448B2

(12) United States Patent
Suh et al.

(10) Patent No.: US 12,282,448 B2
(45) Date of Patent: Apr. 22, 2025

(54) ROUTING METHOD BASED ON A SORTED OPERATION UNIT GRAPH FOR AN ITERATIVE PLACEMENT AND ROUTING ON A RECONFIGURABLE PROCESSOR

(71) Applicant: SambaNova Systems, Inc., Palo Alto, CA (US)

(72) Inventors: Hong Suh, Palo Alto, CA (US); Sumti Jairath, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/226,010

(22) Filed: Jul. 25, 2023

(65) Prior Publication Data

US 2024/0037063 A1    Feb. 1, 2024

Related U.S. Application Data

(60) Provisional application No. 63/392,364, filed on Jul. 26, 2022, provisional application No. 63/392,368, (Continued)

(51) Int. Cl.
*G06F 15/80* (2006.01)
*G06F 9/30* (2018.01)
(Continued)

(52) U.S. Cl.
CPC .......... *G06F 15/80* (2013.01); *G06F 9/30036* (2013.01); *G06F 9/3836* (2013.01); *G06F 15/7871* (2013.01)

(58) Field of Classification Search
CPC .............................. G06F 15/7871; G06F 15/80
See application file for complete search history.

(56) References Cited

U.S. PATENT DOCUMENTS

2009/0119490 A1* 5/2009 Oh ..................... G06F 9/30065
712/214
2012/0204001 A1* 8/2012 Egger .................. G06F 9/3869
712/15

FOREIGN PATENT DOCUMENTS

WO    2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Michael J Metzger
(74) *Attorney, Agent, or Firm* — Flagship Patents; Sikander M. Khan; Joachim Erhard Pistorius

(57) ABSTRACT

A placer and router for an iterative placement and routing of a sorted operation unit graph on a reconfigurable processor is presented as well as a method of operating a placer and router for an iterative placement and routing of a sorted operation unit graph on a reconfigurable processor. The placer and router is configured to receive an architectural specification of the reconfigurable processor and the sorted operation unit graph having an ordered sequence of nodes and edges that interconnect nodes in the ordered sequence of nodes. The placer and router is further configured to iteratively assign nodes of the sorted operation unit graph to locations on the reconfigurable processor followed by an assignment of edges that connect nodes that were assigned in the current iteration and nodes that were assigned in previous iterations to interconnection resources of the reconfigurable processor.

20 Claims, 13 Drawing Sheets

Related U.S. Application Data filed on Jul. 26, 2022, provisional application No. 63/392,374, filed on Jul. 26, 2022.

(51) Int. Cl.
  *G06F 9/38* (2018.01)
  *G06F 15/78* (2006.01)

(56) References Cited

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

ROUTING METHOD BASED ON A SORTED OPERATION UNIT GRAPH FOR AN ITERATIVE PLACEMENT AND ROUTING ON A RECONFIGURABLE PROCESSOR

RELATED APPLICATIONS AND DOCUMENTS

This application claims the benefit of U.S. Provisional Patent Application No. 63/392,364, entitled, "Sorting the Nodes of an Operation Unit Graph for Implementation in a Reconfigurable Processor" filed on 26 Jul. 2022, the benefit of U.S. Provisional Application No. 63/392,368, entitled, "A Placement Method Based on a Sorted Operation Unit Graph for an Iterative Placement and Routing on a Reconfigurable Processor" filed on 26 Jul. 2022, and the benefit of U.S. Provisional Patent Application No. 63/392,374, entitled, "Routing Method Based on a Sorted Operation Unit Graph for an Iterative Placement and Routing on a Reconfigurable Processor" filed on 26 Jul. 2022. These provisional applications are hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862, 445, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 16/197, 826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198, 086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093, 543, filed Nov. 9, 2020, entitled "EFFICIENT CONFIGURATION OF A RECONFIGURABLE DATA PROCESSOR;"

U.S. Nonprovisional patent application Ser. No. 16/260, 548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536, 192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326, 128, filed May 20, 2021, entitled "COMPILER FLOW LOGIC FOR RECONFIGURABLE ARCHITECTURES;"

U.S. Nonprovisional patent application Ser. No. 16/407, 675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504, 627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322, 697, filed May 17, 2021, entitled "QUIESCE RECONFIGURABLE DATA PROCESSOR;"

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590, 058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695, 138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688, 069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718, 094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560, 057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572, 527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930, 381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337, 080, now U.S. Pat. No. 11,328,209 B1, filed Jun. 2, 2021, entitled "MEMORY EFFICIENT DROPOUT;"

U.S. Nonprovisional patent application Ser. No. 17/337, 126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890, 841, filed Jun. 2, 2020, entitled "ANTI-CONGESTION FLOW CONTROL FOR RECONFIGURABLE PROCESSORS;"

U.S. Nonprovisional patent application Ser. No. 17/023, 015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031, 679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175, 289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371, 049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922, 975, filed Jul. 7, 2020, entitled "RUNTIME VIRTUALIZATION OF RECONFIGURABLE DATA FLOW RESOURCES;"

U.S. Nonprovisional patent application Ser. No. 16/996, 666, filed Aug. 18, 2020, entitled "RUNTIME PATCHING OF CONFIGURATION FILES;"

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185, 264, filed Feb. 25, 2021, entitled "TIME-MULTIPLEXED USE OF RECONFIGURABLE HARDWARE;"

U.S. Nonprovisional patent application Ser. No. 17/216, 647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216, 657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384, 515, filed Jul. 23, 2021, entitled "LOSSLESS TILING IN CONVOLUTION NETWORKS—MATERIALIZATION OF TENSORS;"

U.S. Nonprovisional patent application Ser. No. 17/216, 651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216, 652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216, 654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216, 655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364, 110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364, 129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364, 141, filed Jun. 30, 2021, entitled "LOSSLESS TILING IN CONVOLUTION NETWORKS—PADDING AND RE-TILING AT SECTION BOUNDARIES;"

U.S. Nonprovisional patent application Ser. No. 17/384, 507, filed Jul. 23, 2021, entitled "LOSSLESS TILING IN CONVOLUTION NETWORKS— BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216, 509, now U.S. Pat. No. 11,191,182 B1, filed Mar. 29, 2021, entitled "UNIVERSAL RAIL KIT;"

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378, 342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338, 620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338, 625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338, 626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338, 629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405, 913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a method of operating a placer and router for an iterative placement and routing of a sorted operation unit graph on a reconfigurable processor. Furthermore, the present technology relates to a placer and router for an iterative placement and routing of a sorted operation unit graph on a reconfigurable processor and to a non-transitory computer-readable storage medium including instructions that, when executed by a processing unit, cause the processing unit to operate a placer and router for an iterative placement and routing of a sorted operation unit graph on a reconfigurable processor.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures.

A new approach is required to extract more useful work from current semiconductor technologies. Amplifying the gap between required and available computing is the explosion in the use of deep learning. According to a study by OpenAI, during the period between 2012 and 2020, the compute power used for notable artificial intelligence achievements has doubled every 3.4 months.

While the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

It is common for GPUs to be used for training and CPUs to be used for inference in machine learning systems based on their different characteristics. Many real-life systems demonstrate continual and sometimes unpredictable change, which means predictive accuracy of models declines without frequent updates.

Alternatively, reconfigurable processors, including FPGAs, can be configured to implement a variety of functions more efficiently or faster than might be achieved using a general-purpose processor executing a computer program.

Recently, so-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, are usually implemented as dataflow architectures and often include specialized hardware elements such as computing resources and device memory that operate in conjunction with one or more software elements such as a CPU and attached host memory in implementing user applications.

Implementing user applications on reconfigurable processors usually involves placement of the user application onto the reconfigurable processor using a placement tool, which is sometimes also referred to as a placer, and routing of the placed user application using a routing tool, which is sometimes also referred to as a router.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 10' is a second portion of a flowchart showing illustrative operations that a placer and router performs for an iterative placement and routing of a sorted operation unit graph on a reconfigurable processor.

DETAILED DESCRIPTION

Figure 1:
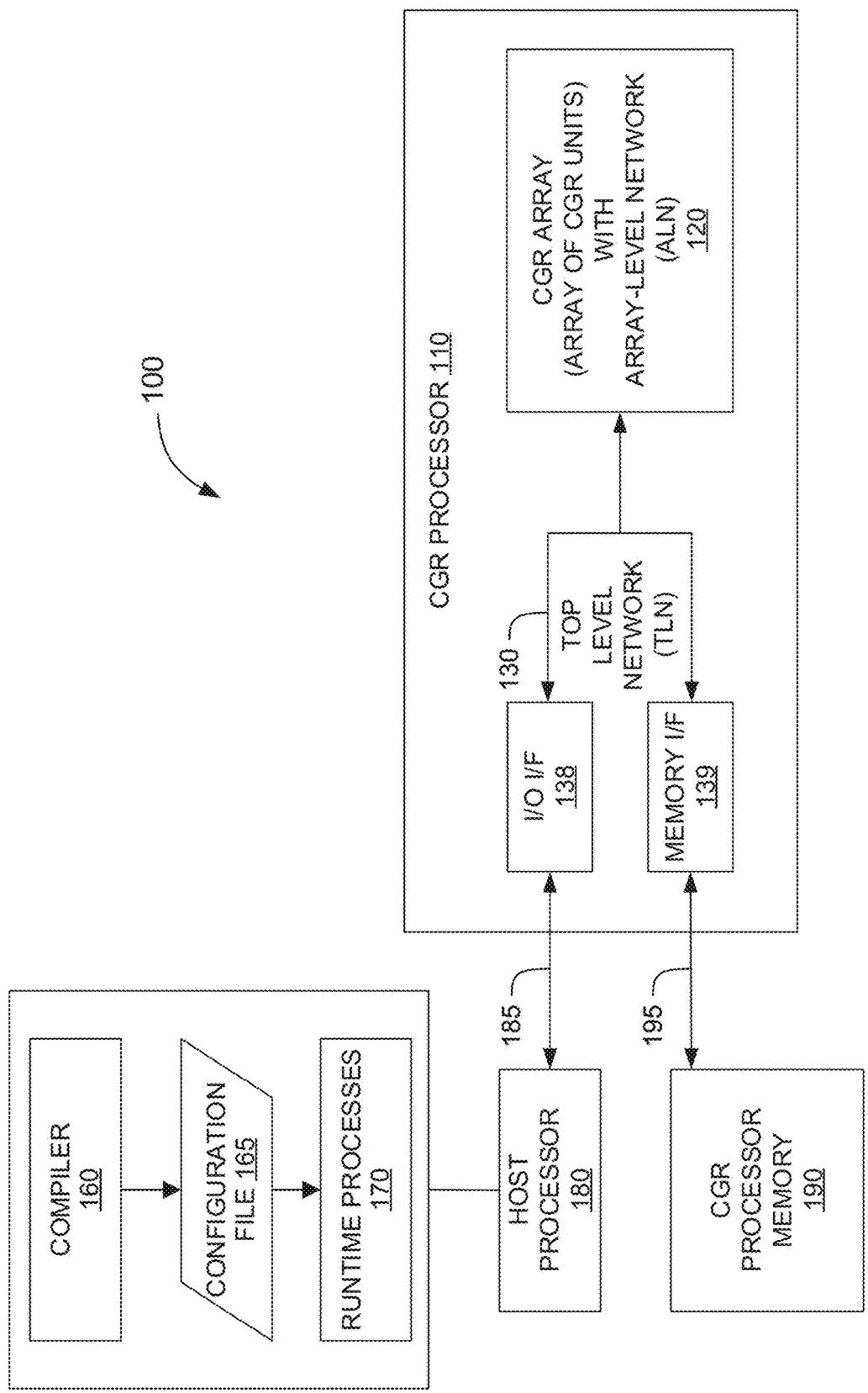
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUs).

The ascent of ML, AI, and massively parallel architectures places new requirements on compilers. Reconfigurable processors, and especially CGRAs, often include specialized hardware elements such as compute units and memory units that operate in conjunction with one or more software elements such as a host processor and attached host memory, and are particularly efficient for implementing and executing highly-parallel applications such as machine learning applications.

Thus, such compilers are required to pipeline computation graphs, or dataflow graphs, decide which operations of an operation unit graph are assigned to which portions of the reconfigurable processor, how data is routed between various compute units and memory units, and how synchronization is controlled, particularly when a dataflow graph includes one or more nested loops, whose execution time varies dependent on the data being processed.

In this context, it is particularly important for the compiler to perform hardware resource allocation during placement and routing such that the performance of a dataflow graph implementation on a given reconfigurable processor is optimized while the implementation optimizes the utilization rate of the reconfigurable processor's hardware resources.

A placement tool typically receives an operation unit graph having nodes that correspond to circuitry on the reconfigurable processor and edges that interconnect the nodes, together with a description of the reconfigurable processor architecture. The placement tool outputs a placed operation unit graph in which each node is assigned to a location on the reconfigurable processor such that one or more objectives is optimized.

Such objectives may include, for example, minimizing wire congestion to ensure that a placed operation unit graph can be routed, optimizing timing such that the implemented application can be executed at a predetermined clock speed, minimizing latency, maximizing throughput, or a combination thereof. Sometimes, measurable approximations of these objectives are used instead to simplify the quantification of these objectives. For example, the estimated maximum wire length between two placed nodes may be used to approximate timing. Conventionally, two or more objectives are combined in form of a cost function. Such a cost function is often expressed in form of a weighted sum of different objectives. The coefficients of the weighted sum may be selected to achieve a predetermined trade-off between the objectives.

Some placement tools start with an initial placement in which every node is assigned to an initial location and an initial cost for the initial placement is calculated. In subsequent passes, the placement tools determine a current placement by assigning nodes to alternative locations and calculate a cost associated with the current placement, which may be selected as the best current placement or not based on the cost. The determination of the current placement and the selection as the best current placement usually depend on the placement tool.

For example, a placement tool that operates on the basis of a simulated annealing (SA) algorithm may start with an initial placement and perform node swaps during an optimization phase. During the optimization phase, the placement tool may randomly select two nodes and swap their location assignments to determine a current placement. The current placement is always adopted if the cost of the current placement is lower than the cost of the best placement encountered so far. However, the current placement is also adopted with a certain probability as the best placement even if the cost of the current placement is higher than the cost of the best placement encountered so far, whereby the probability of accepting node swaps that lead to a current placement with a higher cost than the best placement decreases with the number of node swaps. The acceptance of node swaps that lead to a current placement with a higher cost than the best placement encountered so far is necessary to avoid placement solutions that are associated with a local optimum of the cost function.

After the placement tool has finished placing the operation unit graph, the routing tool begins to connect the placed nodes on the reconfigurable processor according to the connections in the operation unit graph and the available reconfigurable interconnect fabric of the reconfigurable processor. Therefore, the routing tool typically receives the placed operation unit graph together with the description of the reconfigurable processor architecture.

Some routing tools start with an initial routing in which every edge of the operation unit graph uses the shortest path between the source and the sink node, regardless of any congestion or routing blockages. Thereby, edges of the operation unit graph are assigned to a set of interconnect resources on the shortest path between the source and the sink node to form a connection between the source and the sink node on the reconfigurable processor.

In subsequent passes, the routing tool removes and re-routes the connections that use an oversubscribed interconnect resource starting with the connection having the lowest cost path. The cost of using an interconnect resource is dependent on the current overuse of the interconnect resource and any overuse from a prior pass. Thereby, the cost of using an oversubscribed interconnect resource is gradually increased such that connections with the lowest cost path are encouraged to use alternative interconnect resources. Thus, only the connections with the highest cost continue to use the previously oversubscribed interconnect resource.

As mentioned above, CGRAs are an extremely attractive platform when performance, power, or energy efficiency are paramount. A CGRA is usually a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Since reconfigurable processors such as CGRAs have a different architecture than fine-grained reconfigurable devices, it is desirable to provide a new placement and routing approach for implementing user applications on coarse-grained reconfigurable processors. Such a new placement and routing approach may combine the sorting of the nodes in the operation unit graph in preparation for the assignment of nodes from the operation unit graph to circuitry in the reconfigurable processors and the assignment of edges in the operation unit graph to interconnect resources in the reconfigurable processor.

The new approach should quickly and reliably achieve a functioning implementation of the user applications on the coarse-grained reconfigurable processor and provide for a flexible and efficient use of the reconfigurable data-flow resources for the execution of the user applications.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes 170, as further referenced herein. In some implementations, host processor 180 may also be used to run computer programs, such as the compiler 160 further described herein with reference to FIG. 6. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units in the CGR array 120, and to and from host processor 180 and attached CGR processor memory 190.

The compiler may include a cost estimation tool for determining bandwidth requirements of the edges in the computation graph or data flow graph as well as a sorting tool for determining an ordered sequence of nodes in the computation graph or data flow graph for placing and routing the computation graph or data flow graph on CGR processor 110. An illustrative placer and router for an iterative placement and routing of such an ordered sequence of nodes of a computation graph or data flow graph, which is sometimes also referred to as "operation unit graph" is further described herein with reference to FIG. 8.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. Therefore, the configuration file is sometimes also referred to as a programming file.

A single configuration store may be at the level of the CGR processor 110 or the CGR array 120, or a CGR unit may include an individual configuration store. The configuration file 165 may include configuration data for the CGR array and CGR units in the CGR array, and link the computation graph to the CGR array. Execution of the configuration file by CGR processor 110 causes the CGR array(s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
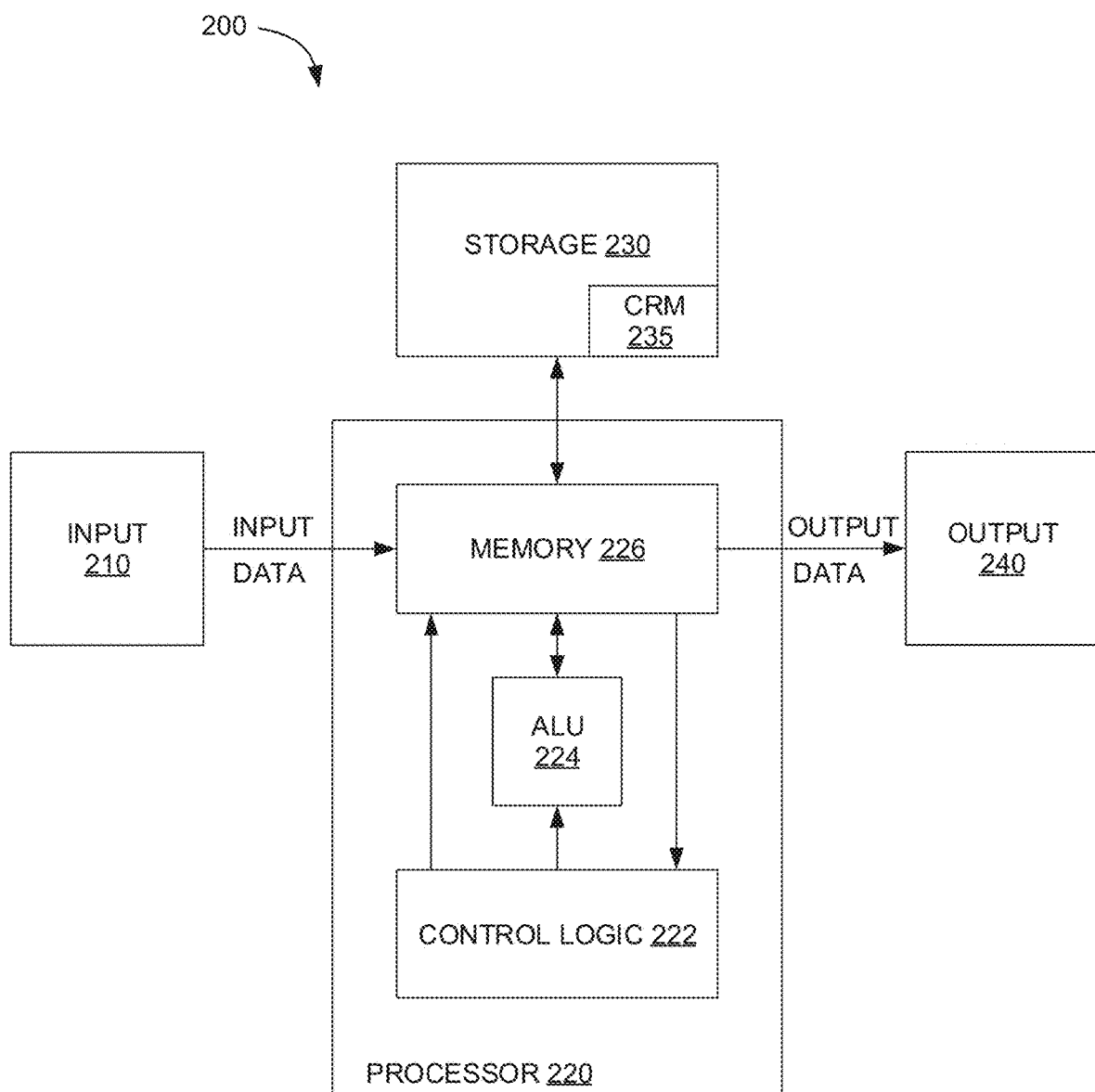
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM) 235, such as used for storing computer programs. The storage device 230 is sometimes also referred to as host memory.

Figure 3:
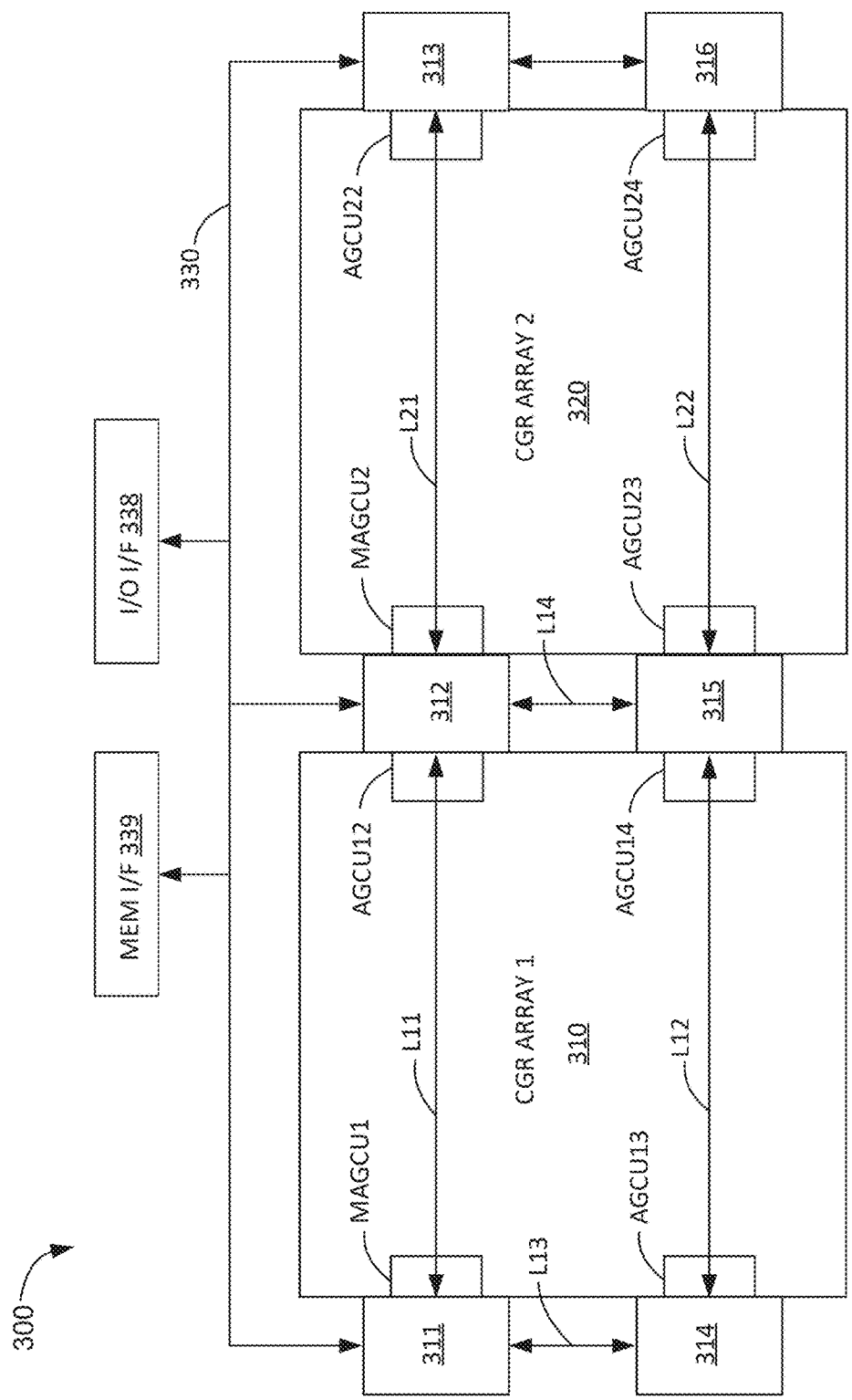
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
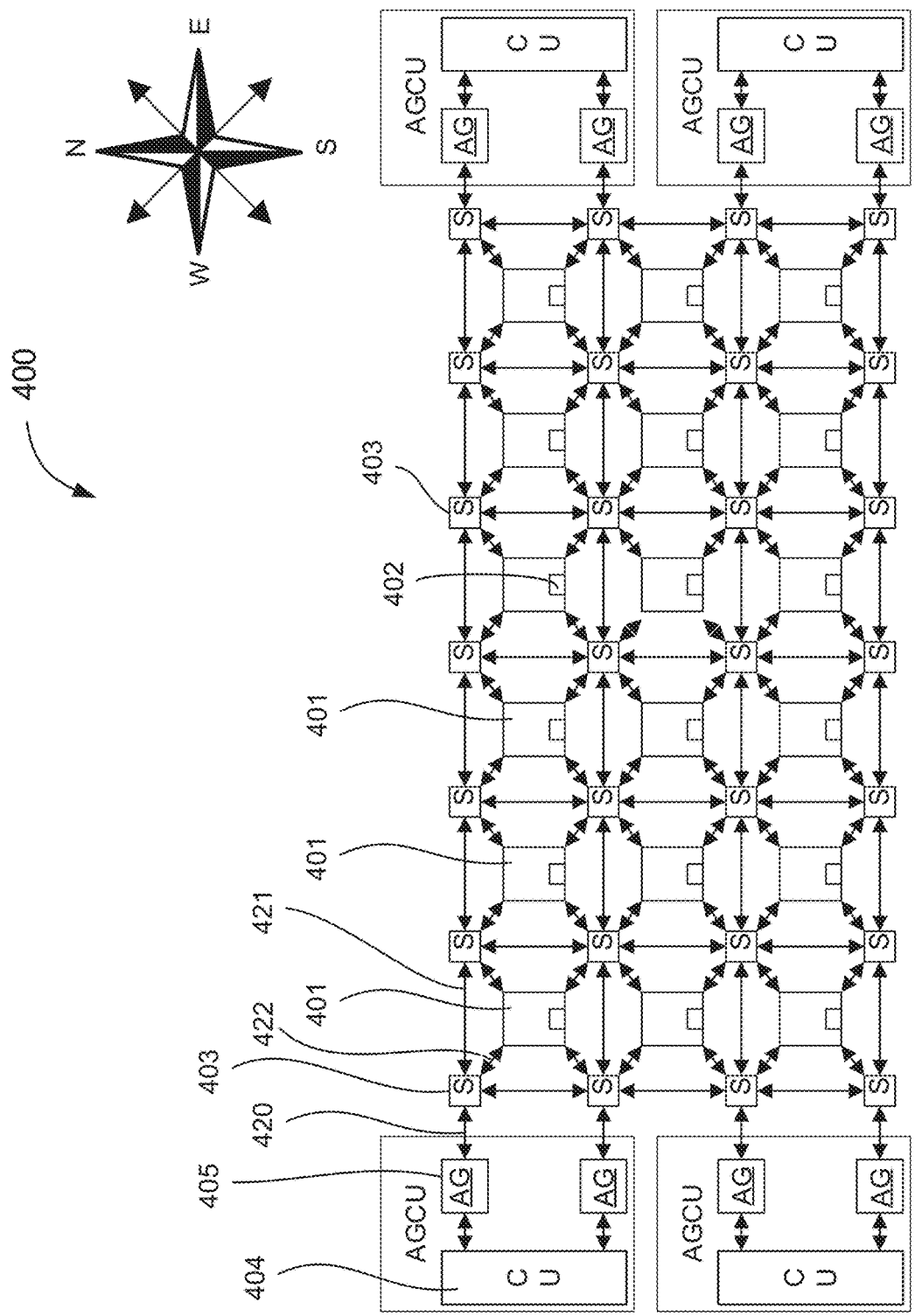
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each CGR unit of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes 170, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., Northeast, Northwest, Southeast, Southwest, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
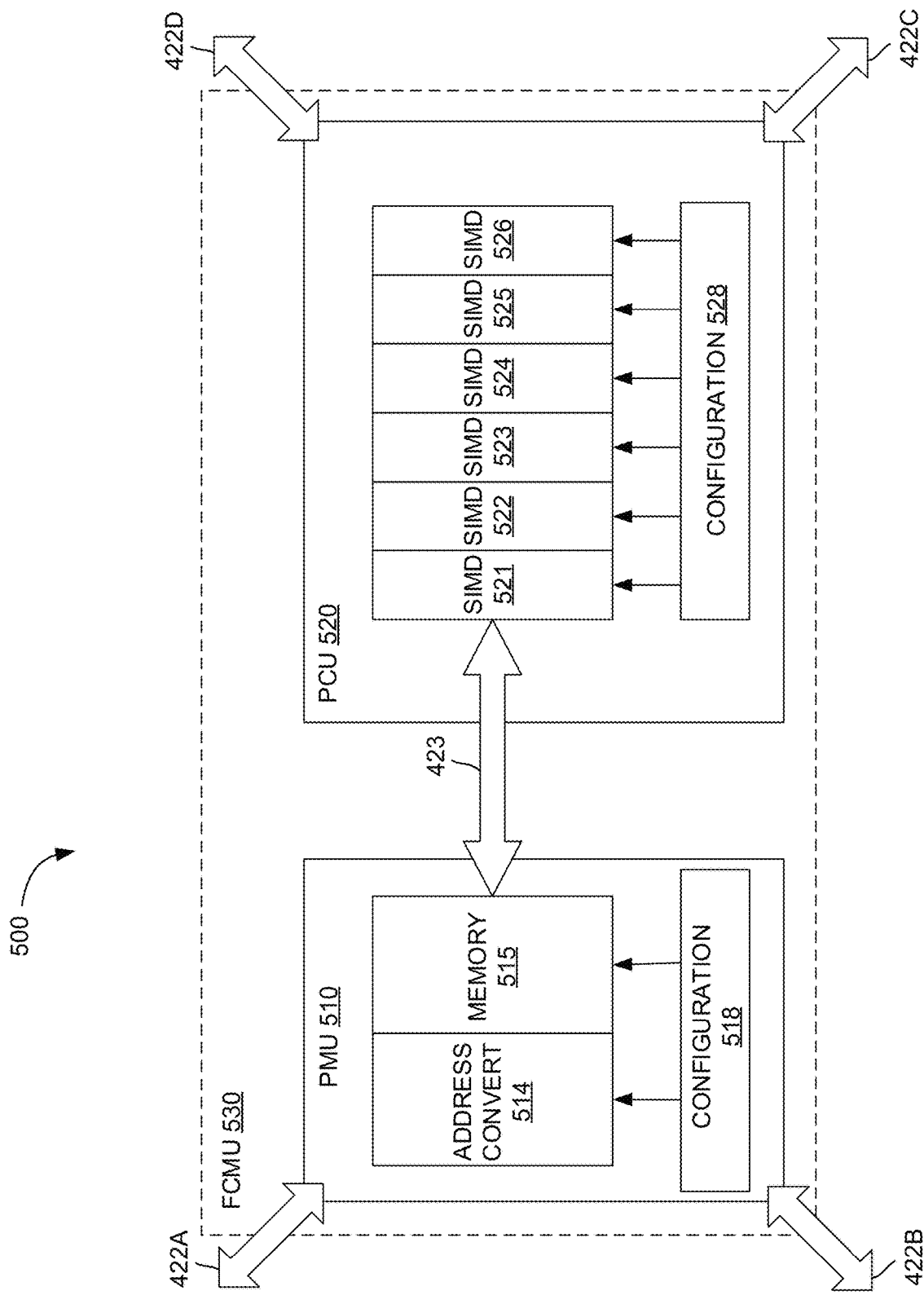
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. The FCMU 530 may include multiple ALN links, such as ALN link 423 that connects PMU 510 with PCU 520, northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D may connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. Configuration store 518 may be loaded, for example, from a program running on host processor 180 as shown in FIG. 1, and can configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as single-instruction multiple-data (SIMD) 521 through SIMD 526, and configuration store 528. The processor stages may include SIMDs, as drawn, or any other reconfigurable stages that can process data. PCU 520 may receive data through ALN links 422C-D, and/or 423, and process the data in the two or more processor stages or store the data in configuration store 528. PCU 520 may produce data in the two or more processor stages, and transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
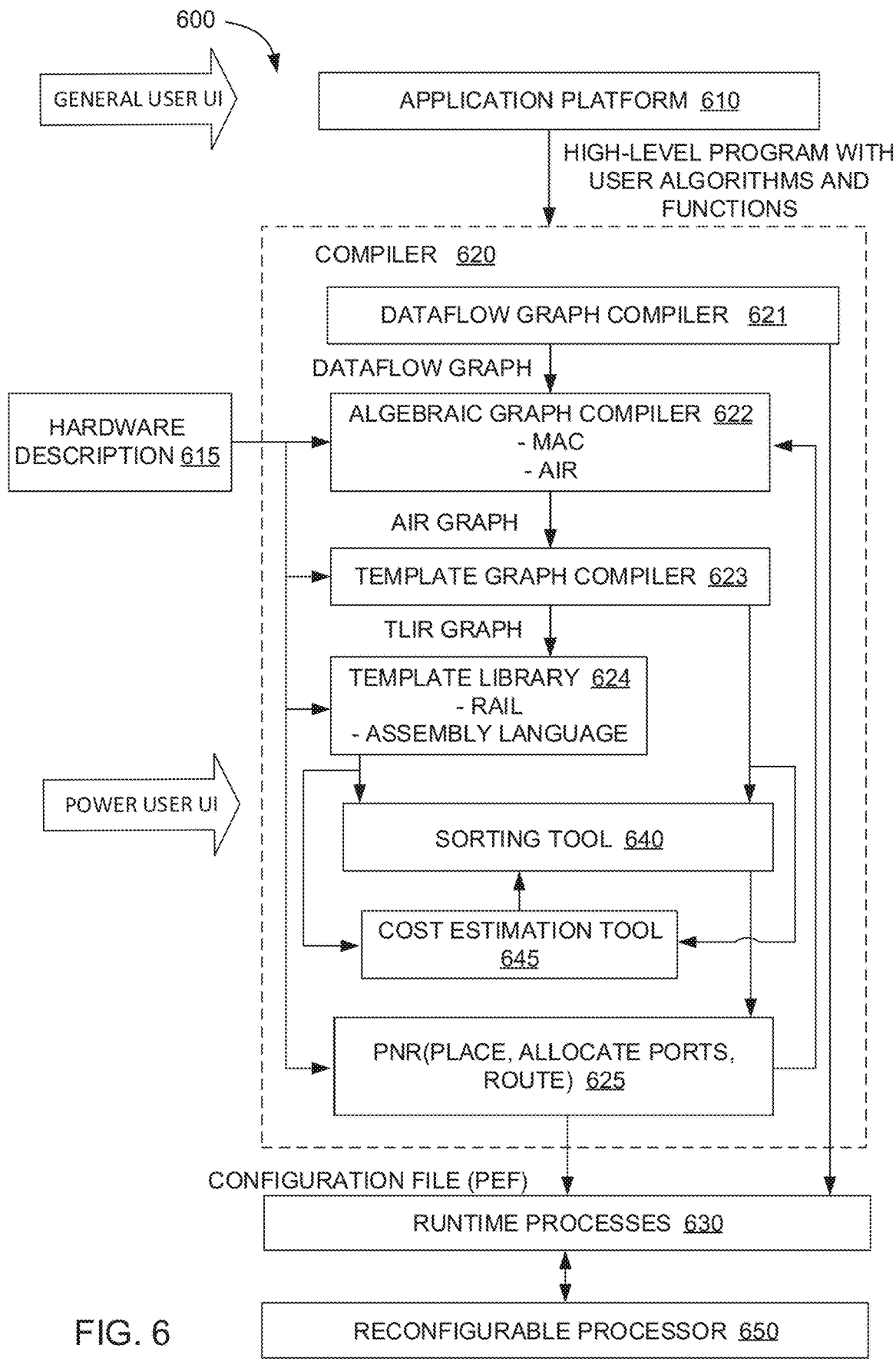
FIG. 6 is a diagram of an illustrative compiler stack implementation suitable for generating a configuration file for a reconfigurable processor.

FIG. 6 is a block diagram of a compiler stack 600 implementation suitable for generating a configuration file for a reconfigurable processor 650 having CGR units such as CGR processor 110 of FIG. 1. As depicted, compiler stack 600 includes several stages to convert a high-level program with statements that define user algorithms and functions, e.g., algebraic expressions and functions, to configuration data for the CGR units. A high-level program may include source code written in programming languages like C, C++, Java, JavaScript, Python, and/or Spatial, for example. In some implementations, the high-level program may include statements that invoke various PyTorch functions.

Compiler stack 600 may take its input from application platform 610, or any other source of high-level program statements suitable for parallel processing, which provides a user interface for general users. If desired, the compiler stack 600 may further receive hardware description 615, for example defining the physical units in a reconfigurable data processor or CGR processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file that is executed in runtime processes 630 using reconfigurable processor 650.

Compiler 620 may include dataflow graph compiler 621, which may handle a dataflow graph, algebraic graph compiler 622, template graph compiler 623, template library 624, placer and router PNR 625, and cost estimation tool 645. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610. As shown in FIG. 6, dataflow graph compiler 621 outputs a dataflow graph that is received by algebraic graph compiler 622.

Algebraic graph compiler 622 may include a model analyzer and compiler (MAC) level that makes high-level mapping decisions for (subgraphs of the) dataflow graph based on hardware constraints. In some implementations, the algebraic graph compiler 622 may support various application frontends such as Samba, JAX, and TensorFlow/HLO. If desired, the algebraic graph compiler 622 may transform the graphs via autodiff and GradNorm, perform stitching between subgraphs, interface with template generators for performance and latency estimation, convert dataflow graph operations to arithmetic or algebraic intermediate representation (AIR) operations, perform tiling, sharding (database partitioning) and other operations, and model or estimate the parallelism that can be achieved on the dataflow graph.

Algebraic graph compiler 622 may further include an arithmetic or algebraic intermediate representation (AIR) level that translates high-level graph and mapping decisions provided by the MAC level into explicit AIR/Tensor statements and one or more corresponding algebraic graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Thus, algebraic graph compiler 622 replaces the user program statements of a dataflow graph by AIR/Tensor statements of an AIR/Tensor computation graph (AIR graph). As shown in FIG. 6, algebraic graph compiler 622 provides the AIR graph to template graph compiler 623.

Template graph compiler 623 may translate AIR/Tensor statements of an AIR graph into template library intermediate representation (TLIR) statements of a TLIR graph, optimizing for the target hardware architecture into unplaced variable-sized units (referred to as logical CGR units) suitable for PNR 625. Such a TLIR graph is sometimes also referred to as an "operation unit graph" and the unplaced-variable-sized units as "logical units" or "nodes". So-called "Logical edges" or simply "edges" in the operation unit graph may couple the logical units.

Template graph compiler 623 may allocate metapipelines for sections of the template dataflow statements and corresponding sections of unstitched template computation graph. Template graph compiler 623 may add further information (e.g., name, inputs, input names and dataflow description) for PNR 625 and make the graph physically realizable through each performed step. For example, template graph compiler 623 may provide translation of AIR graphs to specific model operation templates such as for general matrix multiplication (GeMM). An implementation may convert part or all intermediate representation operations to templates, which are sometimes also referred to as "template nodes", stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units, which are commonly referred to as logical units, with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

In some implementations, the assembler may generate assembler code for a logical unit, whereby the assembler code is associated with a data operation that is to be executed by the logical unit. The logical units of an operation unit graph may include (e.g., store) the assembler code that is associated with the respective data operations of the respective logical units, if desired.

The template graph compiler 623 may also determine control signals, as well as control gates that are required to enable the CGR units (whether logical or physical) to coordinate dataflow between the CGR units in the CGR array of a CGR processor.

As shown in FIG. 6, compiler 620 may include a cost estimation tool 645 and a sorting tool 640. In some implementations, the sorting tool 640 and/or the cost estimation tool 645 may be integrated into PNR 625. In other implementations, the sorting tool 640 and/or the cost estimation tool 645 may be separate from PNR 625, for example as shown in FIG. 6.

Illustratively, cost estimation tool 645 may receive the operation unit graph from the template graph compiler 623 directly and/or through the template library 624. The operation unit graph includes nodes and edges that couple the nodes. Each one of the nodes is associated with a data operation. The cost estimation tool 645 is adapted for determining relative bandwidth requirements of the edges in the operation unit graph.

Sorting tool 640 may receive the operation unit graph and determine an ordered sequence of the nodes in the operation unit graph for PNR 625. For example, the sorting tool 640 may use the relative bandwidth requirements from the cost estimation tool 645 to provide a sorted operation unit graph having an ordered sequence of the nodes to PNR for implementing the operation unit graph on reconfigurable processor 650.

Execution of the sorting tool 640 may be followed by iterative passes of PNR 625 based on the ordered sequence of the nodes, whereby nodes that are earlier in the ordered sequence of nodes are placed and routed before nodes that are later in the node order. In other words, the sorting tool 640 may determine a priority for the placement and routing of the nodes.

PNR 625 translates and maps logical (i.e., unplaced physically realizable) units (e.g., the nodes of the operation unit graph) and edges (e.g., the edges of the operation unit graph) to a physical layout of reconfigurable processor 650, e.g., a physical array of CGR units in a semiconductor chip. PNR 625 also determines physical data channels, which include physical links and switches, to enable communication among the CGR units and between the CGR units and circuits coupled via the TLN or the ALN; allocates ports on the CGR units and switches; provides configuration data and initialization data for the target hardware; and produces configuration files, e.g., processor-executable format (PEF) files.

If desired, PNR 625 may provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules to provide the multiple operations, e.g., a placer, a router, a port allocator, and a PEF file generator, which each may also include multiple units to provide operations within the modules (e.g., as illustratively shown in FIG. 8).

PNR 625 may receive its input data in various ways. For example, it may receive parts of its input data from any of the earlier modules (e.g., dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly. As shown in FIG. 6, PNR 625 may receive a sorted operation unit graph having an ordered sequence of nodes and edges that interconnect nodes in the ordered sequence of nodes from sorting tool 640.

Further implementations of compiler 620 provide for an iterative process, for example by feeding information from PNR 625 back to an earlier module (e.g., to algebraic graph compiler 622). For example, in some implementations, the earlier module may execute a new compilation step in which it uses physically realized results rather than placeholders for physically realizable circuits. As shown in FIG. 6, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

Figure 7:
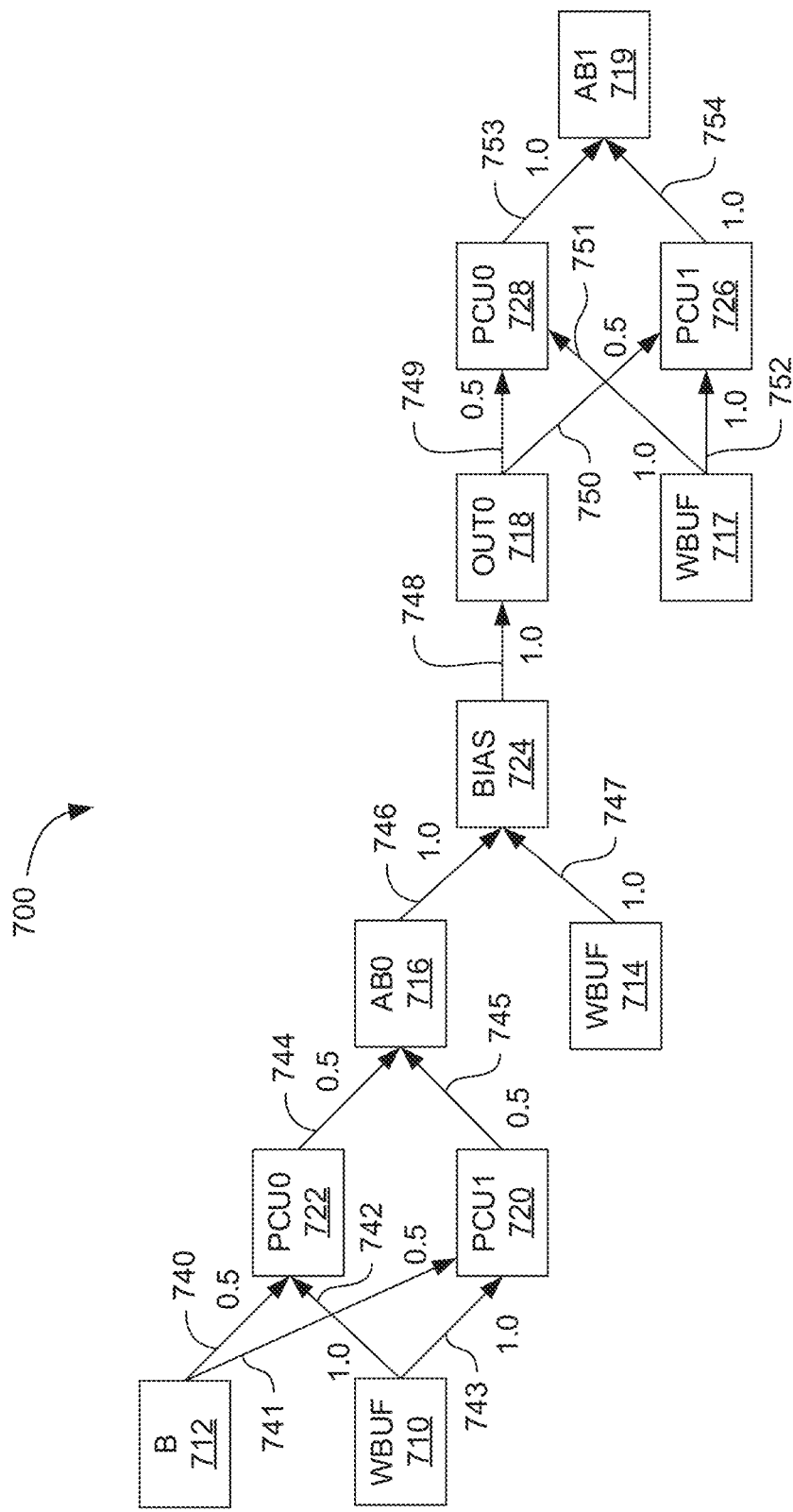
FIG. 7 is a diagram of an illustrative operation unit graph.

FIG. 7 is a diagram of an illustrative operation unit graph 700. The operation unit graph 700 shown in FIG. 7 includes nodes WBUF 710, B 712, WBUF 714, AB0 716, WBUF 717, OUT0 718, AB1 719, PCU1 720, PCU0 722, BIAS 724, PCU1 726, and PCU0 728 and edges 740 to 754 that connect the nodes in operation unit graph 700.

The nodes are associated with data operations. The data operations may include configuration load, configuration unload, arithmetic operations, storage operations, just to name a few. If desired, each node may include assembler code that is associated with the data operation. For example, a first node of the nodes in the operation unit graph may include assembler code that is associated with the data operation of the first node.

Illustratively, the operation unit graph 700 may include different types of nodes. For example, a first node of the nodes may include a compute unit (e.g., PCU 520 of FIG. 5) or a memory unit (e.g., PMU 510 of FIG. 5). As shown in FIG. 7, the operation unit graph 700 may include nodes WBUF 710, B 712, WBUF 714, AB0 716, WBUF 717, OUT0 718, and AB1 719 that may illustratively be associated with a memory unit on a reconfigurable processor such as PMU 510 of FIG. 5 and nodes PCU1 720, PCU0 722, BIAS 724, PCU1 726, and PCU0 728 that may illustratively be associated with a compute unit on a reconfigurable processor such as PCU 520 of FIG. 5.

By way of example, nodes WBUF 710, B 712, WBUF 714, and WBUF 717 are shown as input nodes (i.e., nodes without fan-in and only outgoing edges) and node AB1 719 is shown as output node (i.e., node without fanout and only incoming edges). However, input nodes WBUF 710, B 712, WBUF 714, and WBUF 717 may have input ports and output node AB1 719 may have output ports. For example, the input ports of input nodes and the output ports of the output node may be coupled outside of the operation unit graph 700 (e.g., via a network).

In some implementations, a node may have a type identifier that corresponds to one of the hardware circuits on the reconfigurable processor. An edge of the edges 740 to 754 of the operation unit graph 700 may represent a relationship, a direction, and/or a dependency between the nodes that are connected by the edge. If desired, a weight or cost may be associated with an edge. The weight or cost may be associated with the relative bandwidth requirements of the connection between the nodes that are connected by the edge. If desired, the weight of an edge may be greater than zero and smaller than or equal to one (i.e., 0<edge weight<=1, an edge with weight zero is not required and therefore not shown).

Illustratively, a node may have more than one output edge (e.g., node B 712 has two output edges). In some scenarios, the node may send the same data to more than one other node. As an example, node B 712 of FIG. 7 may send the same data to nodes PCU0 722 and PCU1 720. In this example, the two output edges that transmit the same data to nodes PCU0 722 and PCU1 720 may be a net of fanout two. As another example, node B 712 may send a first set of data to PCU0 722 and a second set of data to PCU1 720, whereby the second set is subset of the first set. If desired, the first set of data may be different from the second set of data.

The operation unit graph 700 of FIG. 7 is a connected operation unit graph in which every node can be reached from at least one input node. In some implementations, the operation unit graph may include two or more connected subgraphs that are not connected with each other.

Figure 8:
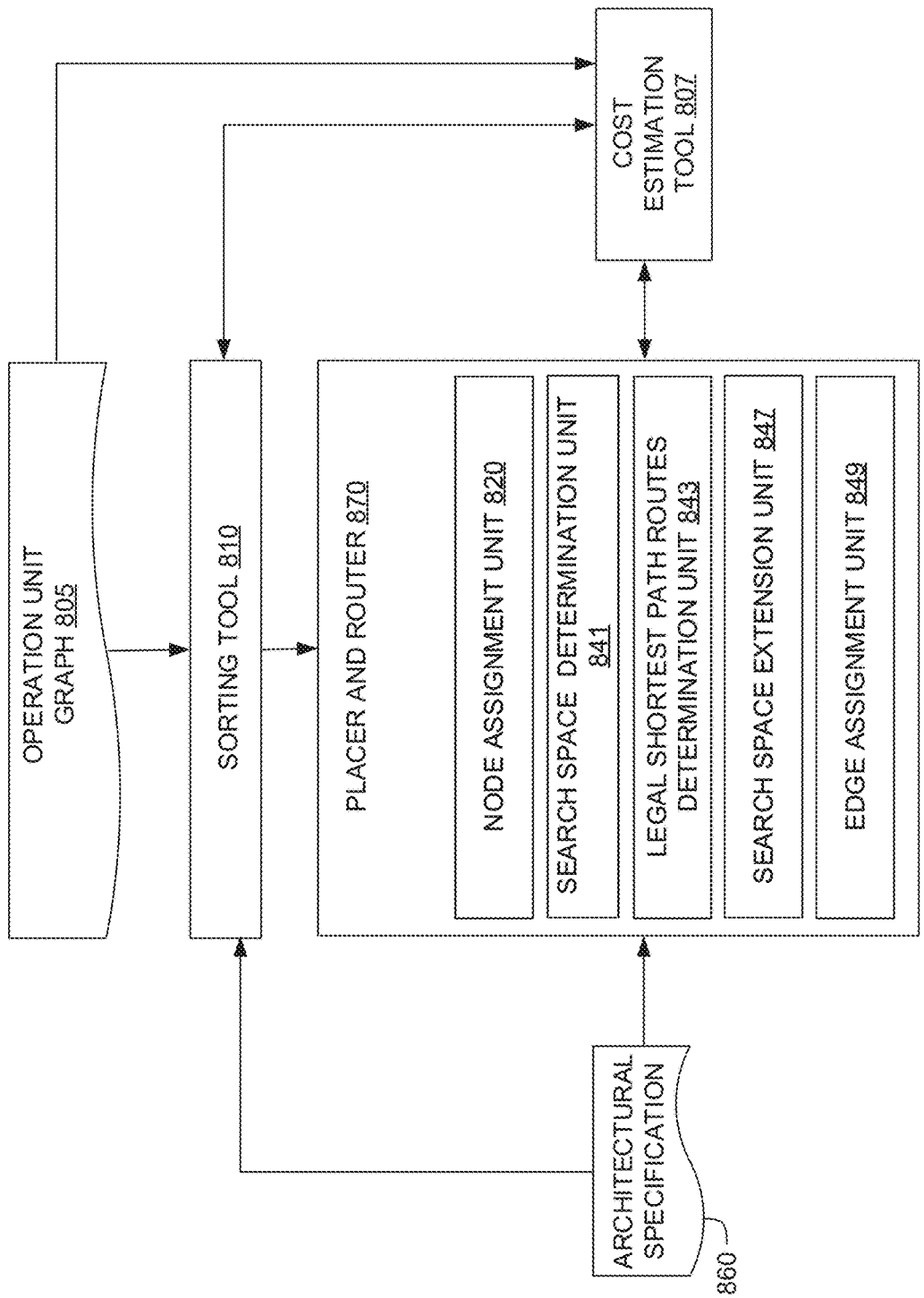
FIG. 8 is a diagram of an illustrative placement and routing tool that receives a sorted operation unit graph with an ordered sequence of nodes and edges that interconnect the nodes in the ordered sequence of nodes.

FIG. 8 is a diagram of an illustrative placer and router 870. Placer and router 870 includes multiple modules and/or tools such as a placement tool and a routing tool. By way of example, the placement tool of the illustrative placer and router 870 may include a node assignment unit 820, and the routing tool of the illustrative placer and router 870 may include a search space determination unit 841, a legal shortest path routes determination unit 843, a search space extension unit 847, and an edge assignment unit 849. If desired, placer and router 870 may include a port allocator and a PEF file generator. In some implementations, placer and router 870 may include a sorting tool and/or a cost estimation tool. As shown in FIG. 8, cost estimation tool 807 and sorting tool 810 are separate from placer and router 870.

Illustratively, the cost estimation tool 807 interfaces with the sorting tool 810 and the placer and router 870. The cost estimation tool 807 may receive the operation unit graph 805 (e.g., operation unit graph 700 of FIG. 7) including nodes and edges that interconnect the nodes. The sorting tool 810 and/or the placer and router 870 may solicit the cost estimation tool 807 to provide valuations to the sorting tool 810 and/or to the placer and router 870. As an example, the sorting tool 810 may solicit the cost estimation tool 807 to provide relative bandwidth requirements of the edges to the sorting tool 810.

As shown in FIG. 8, the sorting tool 810 receives the operation unit graph 805, determines an ordered sequence of the nodes in the operation unit graph 805 and provides the ordered sequence of nodes to the placer and router 870.

Placer and router 870 is configured to receive the sorted operation unit graph having an ordered sequence of nodes and edges that interconnect nodes in the ordered sequence of nodes from sorting tool 810. Placer and router 870 is also configured to receive an architectural specification of the reconfigurable processor (e.g., CGR processor 110 having arrays of CGR units 120 of FIG. 1 or reconfigurable processor 650 of FIG. 6) on which the placer and router 870 implements the sorted operation unit graph.

During placement, a node of the sorted operation unit graph may be placed on the reconfigurable processor. For example, the node of the sorted operation unit graph is assigned as the currently assigned node to a corresponding circuit that is located at an associated location on the reconfigurable processor. During routing, the connections between the currently assigned node and all previously assigned nodes of the operation unit graph that are connected to the currently assigned node are routed.

Illustratively, the configurable interconnect of the reconfigurable processor may be programmed such that the interconnect implements the connections between the currently assigned node and all previously assigned nodes that are connected to the currently assigned node. Thereby, the routing determines the interconnection resources (e.g., switches, channels, links) through which the data flows between the placed nodes (i.e., between the associated locations on the reconfigurable processor). In some implementations, the routing tool may determine the interconnections starting from the source node to the sink node. In other implementations, the routing tool may determine the interconnections starting from the sink node to the source node. In yet other implementations, the routing tool may start from both, from the source node and from the sink node. Thus, placement determines where operations are executed, whereas routing determines the interconnection resources through which data flows between operations.

After having received the architectural specification of the reconfigurable processor and the sorted operation unit graph from the sorting tool 810, the placer and router 870 is configured to repeat a plurality of subsequent operations as long as the ordered sequence of nodes comprises at least one unassigned node. For performing the plurality of subsequent operations, the placer and router is configured to assign a first unassigned node from the ordered sequence of nodes as a currently assigned node to a location on the reconfigurable processor in order of the ordered sequence of nodes, determine a search space on the reconfigurable processor for routing edges-to-be-routed of the edges, whereby the edges-to-be-routed connect the currently assigned node with previously assigned nodes of the ordered sequence of nodes, determine legal shortest path routes on the reconfigurable processor in the search space for the edges-to-be-routed, in response to unsuccessfully determining legal shortest path routes on the reconfigurable processor in the search space for the edges-to-be-routed: expand the search space, and return to determining legal shortest path routes on the reconfigurable processor in the search space for the edges-to-be-routed, or in response to successfully determining legal shortest path routes on the reconfigurable processor in the search space for the edges-to-be-routed: assign the edges-to-be-routed to interconnection resources on the legal shortest path routes.

As mentioned above, the placer and router 870 is configured to assign a first unassigned node from the ordered sequence of nodes as a currently assigned node to a location on the reconfigurable processor in order of the ordered sequence of nodes. Thus, nodes that are earlier in the ordered sequence of nodes may be placed and routed before nodes that are later in the ordered sequence of nodes. Alternatively, nodes that are later in the ordered sequence of nodes may be placed and routed before nodes that are earlier in the ordered sequence of nodes. In other words, the ordered sequence of nodes determines a priority for the placement and routing of the nodes.

The search space determination unit 841 of the placer and router 870 is configured to determine a search space on the reconfigurable processor for routing edges-to-be-routed of the edges, whereby the edges-to-be-routed connect the currently assigned node with previously assigned nodes of the ordered sequence of nodes. As an example, the search space determination unit 841 of the placer and router 870 may be configured to determine a smallest connected area on the reconfigurable processor that includes the currently assigned node and the previously assigned nodes of the ordered sequence of nodes that are connected via the edges-to-be-routed with the currently assigned node. The smallest connected area may have any shape. In some implementations, the placer and router 870 may determine a convex shape. As another example, the search space determination unit 841 of the placer and router 870 may be configured to determine a rectangular bounding box that includes the currently assigned node and the previously assigned nodes of the ordered sequence of nodes that are connected via the edges-to-be-routed with the currently assigned node as the search space. In the rectangular bounding box, a first node and a second node of the currently assigned node and the previously assigned nodes that are connected via the edges-to-be-routed with the currently assigned node may be located in opposite corners of the rectangular bounding box. As yet another example, the search space determination unit 841 of the placer and router 870 may be configured to determine a rectangular bounding box that includes the currently assigned node and the previously assigned nodes of the ordered sequence of nodes that are connected via the edges-to-be-routed with the currently assigned node expanded by a predetermined size in length and/or width of the rectangular bounding box as the search space.

The placer and router 870 is configured to determine routes for the edges-to-be-routed in the search space. Thereby, the placer and router 870 may route nets having a fanout that is greater than one as separate one-to-one connections. For example, consider the scenario in which a source node is connected via N edges with N sink nodes and in which the source node transmits the same data over the N edges to the N sink nodes. In this scenario, the placer and router 870 may route the N edges as N separate one-to-one connections. In some implementations, the same interconnection resource may be used by more than one of the N edges, and the routing tool may count such a shared interconnection resource (e.g., a switch-to-switch connection) only once for the purpose of determining the bandwidth of this interconnection resource.

The legal shortest path routes determination unit 843 of the placer and router 870 is configured to determine legal shortest path routes on the reconfigurable processor in the search space for the edges-to-be-routed. Thus, the placer and router 870 is configured to restrict the shortest path determination to legal routes in the search space. Such legal routes have the capacity and configuration abilities to implement the edges-to-be-routed. Thus, any routes that the placer and router 870 can find for the edges-to-be-routed in the search space are valid and legal routes by construction.

The legal shortest path routes determination unit 843 may use any method for determining the legal shortest path routes on the reconfigurable processor. For example, the legal shortest path routes determination unit 843 may use Dijkstra's method or any other traversal and annotation method (e.g., a breadth-first search (BF S) or a depth-first search (DFS)), just to name a few.

Illustratively, for each edge of the edges-to-be-routed, the placer and router 870 may be configured to determine a legal shortest-path tree that implements the edge using the interconnection resources on the reconfigurable processor.

If desired, each one of the interconnection resources may have an associated valuation. The placer and router 870 may determine, based on the associated valuation of an interconnection resource, whether that interconnection resource may be used as a legal route for an edge of the edges-to-be-routed. In response to determining that the interconnection resource may not be used as a legal route for the edge, the placer and router 870 may attempt to find other interconnection resources in the search space for the edge.

The associated valuation of each one of the interconnection resources may include a cost function. The cost function may be based on a sum of current bandwidths of the interconnection resources. Thus, the legal shortest-path tree may have an associated total valuation, and any other tree that implements the edge using the interconnection resources in the search space has a worse associated total valuation than the total valuation of the legal shortest-path tree.

In some implementations, for determining the legal shortest-path tree that implements the edge using the interconnection resources on the reconfigurable processor, the placer and router may be configured to determine whether a previously assigned node of the previously assigned nodes of the ordered sequence of nodes is a source node of the edge, and in response to determining that the previously assigned node is the source node of the edge, determine the legal shortest-path tree that implements the edge between the previously assigned node and the currently assigned node using the interconnection resources on the reconfigurable processor by starting from the previously assigned node of the ordered sequence of nodes.

Thereby, the placer and router 870 may be configured to consider previously used interconnection resources that implement portions of the edge between the previously assigned node and other ones of the previously assigned nodes as being part of the previously assigned node. In other words, the placer and router 870 may not only determine the legal shortest-path tree by starting from the source node, but also by starting from interconnection resources such as switches that are part of the same net and have been assigned to interconnection resources in previous iterations. For example, consider the scenario in which an edge A between a previously assigned node A and another previously assigned node B has been assigned to a set of interconnection resources. Consider further that the same data that is sent over edge A from previously assigned node A to previously assigned node B is also sent to the currently assigned node. In this scenario, when determining the legal shortest-path tree including previously assigned node A and the currently assigned node, the placer and router 870 may consider that the use of the interconnection resources in the set of interconnections resources incurs no extra cost.

In other implementations, for determining the legal shortest-path tree that implements the edge using the interconnection resources on the reconfigurable processor, the placer and router may be configured to determine whether the currently assigned node is a source node of the edge, and in response to determining that the currently assigned node is the source node of the edge, determine the legal shortest-path tree that implements the edge using the interconnection resources on the reconfigurable processor by starting from the currently assigned node.

Thereby, the placer and router 870 may be configured to consider previously used interconnection resources that implement portions of the edge between the currently assigned node and other ones of the previously assigned nodes as being part of the currently assigned node. In other words, the placer and router 870 may not only determine the legal shortest-path tree by starting from the source node, but also by starting from interconnection resources such as switches that are part of the same net and have been assigned to interconnection resources in previous routes. For example, consider the scenario in which an edge A connects the currently assigned node with a previously assigned node A and another previously assigned node B and that the same data is sent over edge A to previously assigned node A and to previously assigned node B. Consider further that the placer and router 870 determines a first legal shortest path route from the currently assigned node to previously assigned node A and then a second legal shortest path route from the currently assigned node to previously assigned node B. In this scenario, when determining the legal shortest path route between the currently assigned node and previously assigned node B, the placer and router 870 may consider that the use of the interconnection resources that are part of the legal shortest path route from the currently assigned node to previously assigned node A incurs no extra cost.

As an example, the currently assigned node and the previously assigned node may be placed in the same location. For example, the previously assigned node may be placed in the memory unit and the currently assigned node in the compute unit of a fused unit (e.g., the previously assigned node may be placed in the PMU 510 and the currently assigned node in the PCU 520 of FCMU 530 of FIG. 5 or the currently assigned node may be placed in the PMU 510 and the previously assigned node in the PCU 520 of the FCMU). In this example, the routing tool may connect the currently assigned node with the previously assigned node using the internal interconnection of the fused unit (e.g., data connection 423 between PMU 510 and PCU 520 of FCMU 530 of FIG. 5).

As another example, the routing tool may connect the currently assigned node to the nearest switch (e.g., a switch A) and the previously assigned node to the nearest switch, which may be the same switch (i.e., the switch A). For example, consider the scenario in which the currently assigned node connects to the NE connection of the switch and the previously assigned node to the SW connection of the switch. In this example, the routing tool may program the switch (e.g., provide configuration data that configures the switch appropriately) such that the switch connects the NE connection with the SW connection.

As yet another example, the routing tool may connect the currently assigned node to its nearest switch (e.g., a switch A) and the previously assigned node to its nearest switch, which may be another switch (e.g., a switch B). In this example, the routing tool may search for routing channels and eventually other switches between the switches A and B. In some implementations, the switches may be arranged in a grid of rows and columns. In these implementations, the routing tool may try a straightforward route that extends the route from the switch A in vertical direction along a column of switches first and then in horizontal direction along a row of switches to reach the switch B. Alternatively, the routing tool may try another straightforward route that extends the route from the switch A in horizontal directions along a row of switches first and then in vertical direction along a column of switches to reach the switch B.

In some scenarios, the routing tool may not find a valid solution for connecting the switch A with the switch B using a straightforward route. For example, the straightforward route between the switches A and B may be congested. Illustratively, congestion may occur if a sink node of an edge consumes one vector a cycle and the corresponding source node of the edge cannot supply the one vector a cycle because of limitations in the interconnection between the source and the sink node. Thus, the bandwidth requirements of an edge and the associated interconnections on the reconfigurable processor may depend on the operations per second that the source and sink nodes may execute.

Illustratively, the routing tool may search for routing channels including physical links and eventually other switches between the source and sink nodes (e.g., between the switches A and B) using Dijkstra's algorithm. The cost for Dijkstra's algorithm may be based on a predetermined cost function.

By way of example, the predetermined cost function may be based on a single criterion. If desired, the predetermined cost function may be based on two or more criteria. As an example, the predetermined cost function may be calculated as a weighted sum of the two or more criteria. As another example, the predetermined cost function may be based on a first criterion of the two or more criteria and each subsequent criterion may be considered only if two or more candidate locations have the same cost. Additional criteria may be considered based on the architecture of the underlying reconfigurable processor, if desired.

Illustratively, the predetermined cost function may be based on the usage of the interconnection resources for the routes (e.g., channel usage, switch usage, or any combination thereof) between the currently assigned node and previously assigned nodes. In some implementations, the cost may be a weighted sum of the number of switches, the number of vertical connections and their length, and the number of horizontal connections and their length. For example, the weight may be selected to be the associated bandwidth requirement of the edge. In other implementations, the cost may consider the connections between already placed nodes. For example, the cost may be based on the total current congestion of the interconnection fabric after placing the currently assigned node in the current candidate location.

As an example, the predetermined cost function for Dijkstra's algorithm may be based on the sum of the current bandwidths of the interconnection segments and/or the switches. For example, the cost of using an interconnection segment may be zero if the interconnection segment is not congested, and the cost of using the interconnection may be greater than zero if the interconnection segment is congested. If desired, the cost may be weighted such that few higher congestions have a bigger impact than many smaller congestions. For example, the cost may be equal to the current bandwidth to the power of two or to the power of three, etc.

As another example, the predetermined cost function for Dijkstra's algorithm may be based on the number of exposed virtual channels of type A (i.e., VCAs).

As yet another example, the predetermined cost function for Dijkstra's algorithm may be based on the number of wires used. In some implementations, vertical wires and horizontal wires may have a different associated cost. In other implementations, vertical wires and horizontal wires may have a same associated cost.

In some scenarios, the placer and router 870 may fail to find a valid route in the search space. In response to unsuccessfully determining the legal shortest path routes on the reconfigurable processor in the search space for the edges-to-be-routed, the search space extension unit 847 of the placer and router 870 is configured to expand the search space, and return to determining the legal shortest path routes on the reconfigurable processor in the search space (i.e., the expanded search space) for the edges-to-be-routed.

In some implementations, interconnection resources on the reconfigurable processor are arranged in rows and columns. In these implementations, the placer and router 870 may be configured to expand the search space by a predetermined number of rows and/or columns in each cardinal direction. For example, the routing tool may expand the search space by one row or column in each one of the North, East, South, and West directions (e.g., as shown in FIG. 4). Thereby, the search space may include two more rows and two more columns each time the search space is expanded. In some scenarios, the search space may be expanded by less than two rows (e.g., if the current search space already includes the top row and/or the bottom row of the reconfigurable processor) or by less than two columns (e.g., if the current search space already includes the leftmost columns and/or the rightmost column of the reconfigurable processor).

Thus, for expanding the search space, the placer and router 870 may be configured to expand the search space from the current border in positive horizontal direction by a first predetermined number of columns, in negative horizontal direction by a second predetermined number of columns, in positive vertical direction by a first predetermined number of rows, and/or in negative vertical direction by a second predetermined number of rows.

When the search space has been expanded, the placer and router 870 returns to determining the legal shortest path routes on the reconfigurable processor in the search space (i.e., the newly expanded search space) for the edges-to-be-routed.

After having successfully determined the legal shortest path routes on the reconfigurable processor in the search space for the edges-to-be-routed, the edge assignment unit 849 of the placer and router 870 is configured to assign the edges-to-be-routed to interconnection resources on the legal shortest path routes. Thus, the interconnection resources on the legal shortest path routes form data connections on the reconfigurable processor for transmitting the data between the currently assigned node and the previously assigned nodes that are coupled via the edges-to-be-routed with the currently assigned node. For example, the placer and router 870 may assign the corresponding physical links and/or channels of the reconfigurable processor to the edges-to-be-routed and/or program the corresponding configurable switches such that the configurable switches connect physical links and/or channels on the input to physical links and/or channels on the output.

If desired, the ports of the currently assigned node that connect to the edges-to-be-routed and/or the ports of the previously assigned nodes that connect to the edges-to-be-routed may be predetermined. In some implementations, predetermined ports may be routed to any neighboring switch. In other implementations, predetermined ports may be fixedly connected to a switch. If desired, the placer and router 870 may be allowed to rip-up and re-route a connection between a node's port and a switch (e.g., by choosing another port of the node). In some implementations, the placer and router 870 may rip-up and re-routed node to switch or switch to node connections based on the reconfigurable processor. For example, the routing tool may be allowed to reallocate input ports of PMUs, but being denied to reallocate input ports of PCUs or any combination thereof.

As an example, consider the scenario in which placer and router 870 performs an iterative placement and routing of the operation unit graph 700 of FIG. 7 on a reconfigurable processor. As mentioned above, the operation unit graph 700 may include nodes WBUF 710, B 712, WBUF 714, AB0 716, WBUF 717, OUT0 718, and AB1 719 that may illustratively be associated with a memory unit on a reconfigurable processor such as PMU 510 of FIG. 5 and nodes PCU1 720, PCU0 722, BIAS 724, PCU1 726, and PCU0 728 that may illustratively be associated with a compute unit on a reconfigurable processor such as PCU 520 of FIG. 5.

The reconfigurable processor may include a CGR array similar to CGR array 400 of FIG. 4 having ten FCMUs (e.g., FCMUs 530 as shown in FIG. 5) that are arranged in a grid of two rows and five columns. Each FCMU may include a PMU and a PCU (e.g., as shown in FIG. 5).

A grid of switches may be arranged between the FCMUs (e.g., as shown in FIG. 4). Channels may interconnect the switches among themselves and the switches with FCMUs. For example, as shown in FIG. 4, channels 421 may interconnect a switch 403 with other switches 403, and channels 422 may interconnect switches 403 with FCMUs 401.

Illustratively, the reconfigurable processor may have the following architectural limitations specified in the architectural specifications:

Every PCU can only receive inputs from the attached PMU or from the switches that are to the northeast (NE) or southeast (SE) of the PCU. Thus, only the southwest (SW) route of a switch or the northwest (NW) route of a switch leads to the adjacent PCU. Every PCU can only send outputs to the switches that are to the northeast (NE) of the PCU.

Every PMU can only receive inputs from the switches that are to the NW or SW of the PMU. Thus, only the SE route of a switch or the NE route of a switch leads to the adjacent PMU. Every PMU can only send outputs to the attached PCU or to the switches that are to the NW or SW of the PMU.

Each switch connects via north (N), east (E), south (S), west (W) connections to other, adjacent switches.

In this scenario, the sorting tool 810 may receive the operation unit graph and generate a sorted operation unit graph having an ordered sequence of nodes and edges that interconnect nodes in the ordered sequence of nodes.

The sorting tool 810 may determine a first node that is the starting point of the sorting. As an example, the first node may be randomly selected among all the nodes of the operation unit graph 805. As another example, the operation unit graph 805 may include a list of all the nodes, and determining the first node may include selecting a node that is at a predetermined position (e.g., the first node, the last node, etc.) in the list. As yet another example, the first node may be determined as being a source node (i.e., a node without fan-in) or a sink node (i.e., a node without fanout) of a longest path between a source and a sink node. As an example, a depth-first search (DFS) or a breadth-first search (BFS) may be used to determine the longest path between a source and a sink node. As another example, Dijkstra's algorithm may be used to determine the longest path between a source and a sink node.

In the example of FIG. 7, the longest paths from source nodes WBU 710, B 712, WBUF 714, and WBUF 717 have a length of six, six, four, and two, respectively.

By way of example, the first node may be determined as being the source node of the longest path. If desired, the first node may be determined as being the sink node of the longest path. In the example of FIG. 7, node WBUF 710 may be determined as being the source node of the longest path.

Starting with the first node, the second node and any subsequent node of the ordered sequence of nodes may be determined by keeping track of a priority queue (e.g., a min priority queue or a max priority queue), and the first node in the queue may be selected as the next node of the sorting tool 810.

In the example of the operation unit graph 700 of FIG. 7, node WBUF 710 may be inserted into the ordered sequence of nodes at the first position in a first operation. In a second operation, all neighbors of node WBUF 710 may be added to the priority queue. For this purpose, the key (or all keys) of PCU0 722 and PCU1 720 may be determined (e.g., based on the bandwidth of the connection of nodes PCU0 722 and PCU1 720 with already sorted node WBUF 710). In a third operation, node PCU0 722 is inserted first into the priority queue followed by node PCU1 720.

In a fourth operation, the node that is first in the priority queue (i.e., node PCU0 722) is popped from the priority queue and inserted into the ordered sequence of nodes. If all nodes have been sorted, the sorting tool 810 stops. Otherwise, the sorting tool 810 returns to the second operation to add the neighbors (i.e., nodes B 612 and AB0 716) of the recently inserted node (i.e., node PCU0 722) to the priority queue.

Once the sorting tool 810 has terminated, the resulting ordered sequence of nodes of the illustrative operation unit graph 700 of FIG. 7 may have the order of WBUF 710, PCU0 722, PCU1 720, B 612, AB0 716, bias 624, WBUF 714, OUT0 718, PCU0 728, PCU1 726, WBUF 717, and AB1 719.

Figure 9A:
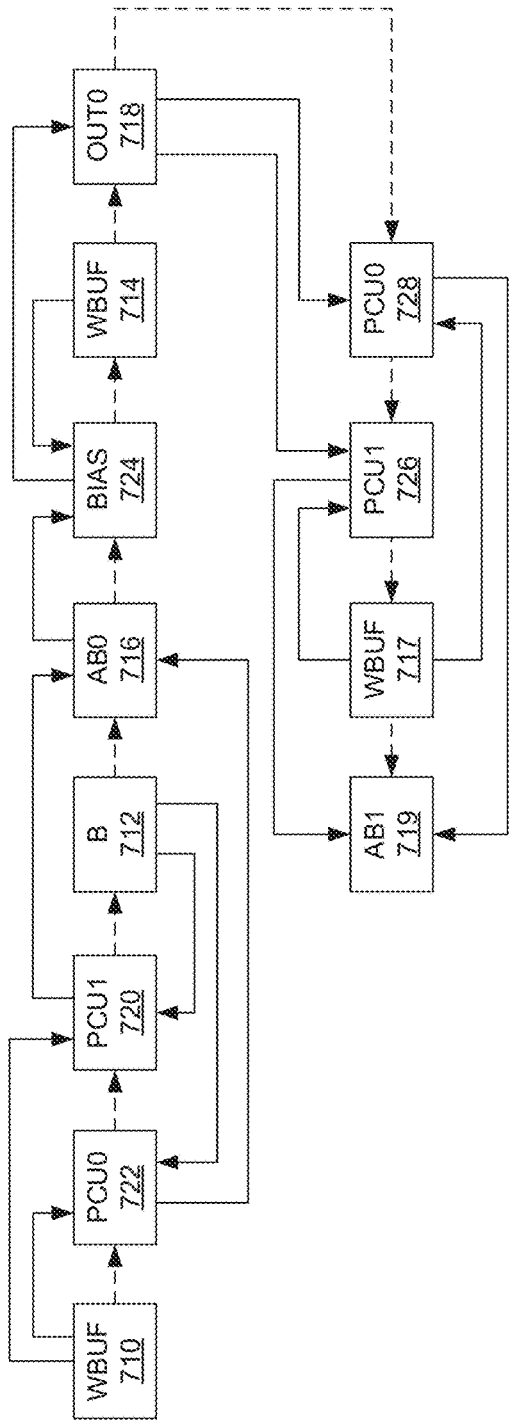
FIG. 9A is a diagram of an illustrative ordered sequence of nodes of the illustrative operation unit graph of FIG. 7.

FIG. 9A is a diagram of an illustrative sorted operation unit graph having an ordered sequence of nodes and edges that interconnect nodes in the ordered sequence of nodes that sorting tool 810 may generate from the illustrative operation unit graph 700 of FIG. 7.

A placer and router such as placer and router 870 of FIG. 8 receives the sorted operation unit graph of FIG. 9A with the ordered sequence of nodes and edges that interconnect the nodes in the ordered sequence of nodes. The placer and router also receives an architectural specification of the reconfigurable processor and performs iterative passes of placement and routing based on the ordered sequence of nodes. As an example, nodes that are earlier in the ordered sequence of nodes may be placed and routed before nodes that are later in the ordered sequence of nodes. As another example, nodes that are later in the ordered sequence of nodes may be placed and routed before nodes that are earlier in the ordered sequence of nodes. In other words, the sorting tool 810 may determine a priority for the placement and routing of the nodes of the operation unit graph.

Figure 9B:
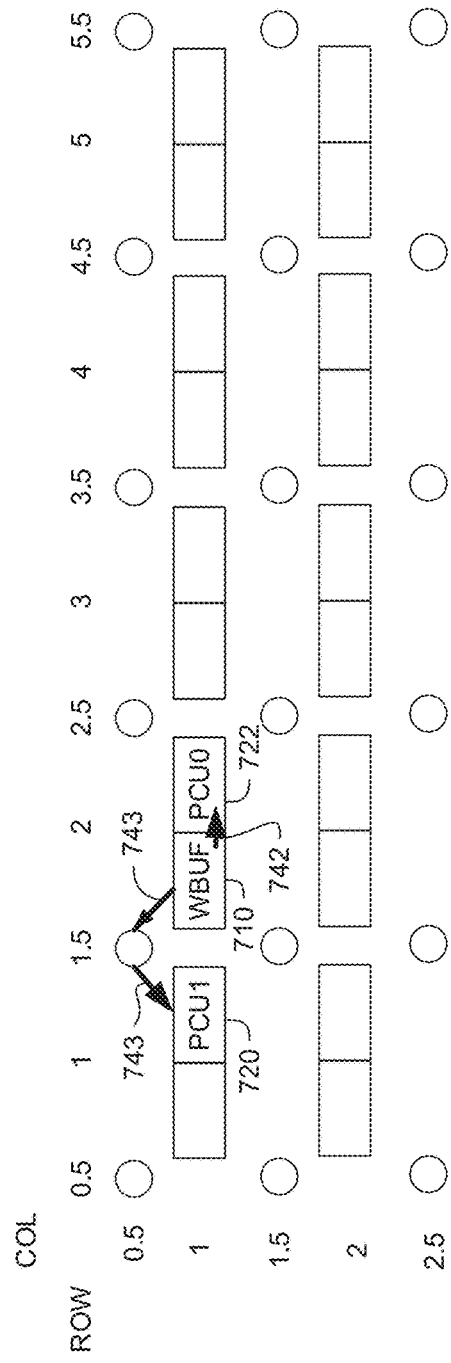
FIG. 9B is a diagram of an illustrative assignment of the first three nodes of the ordered sequence of nodes and the connections between these nodes of FIG. 9A onto a reconfigurable processor.

FIG. 9B is a diagram of an illustrative assignment of the first three nodes of the ordered sequence of nodes of FIG. 9A onto a reconfigurable processor.

In a first iteration, the placer and router may assign node WBUF 710 as the first unassigned node from the ordered sequence of nodes as a currently assigned node to a location on the reconfigurable processor. For example, the placer and router may assign node WBUF 710 as a currently assigned node to the PMU location at row 1, column (col) 2, which may be abbreviated as (row 1, col 2) or just (1, 2).

Since there are no edges-to-be-routed yet and the ordered sequence of nodes includes 11 unassigned nodes, the placer and router may continue with the second iteration.

In the second iteration, the placer and router may assign node PCU0 722 as the first unassigned node from the ordered sequence of nodes as a currently assigned node to a location on the reconfigurable processor. For example, the placer and router may assign node PCU0 722 as the currently assigned node to the PCU at location (row 1, col 2).

In a next operation, the placer and router may determine a search space on the reconfigurable processor for routing edges-to-be-routed of the edges. The edges-to-be-routed include edge 742 that connects the currently assigned node (i.e., PCU0 722) with previously assigned nodes (i.e., WBUF 710) of the ordered sequence of nodes. In the present case, the initial search space is determined to include the local connection inside the FCMU at location (1, 2). Since the local connection inside the FCMU represents a legal shortest path route for edge 742, edge 742 is assigned to the local connection.

Since there are no edges-to-be-routed left, and the ordered sequence of nodes includes 10 unassigned nodes, the placer and router may continue with a third iteration.

In the third iteration, the placer and router may assign node PCU1 720 as the first unassigned node from the ordered sequence of nodes as a currently assigned node to a location on the reconfigurable processor. For example, the placer and router may assign node PCU1 720 as the currently assigned node to the PCU at location (row 1, col 1).

Next, the placer and router may determine a search space on the reconfigurable processor for routing edges-to-be-routed of the edges. The edges-to-be-routed include edge 743 that connects the currently assigned node (i.e., PCU1 720) with previously assigned nodes (i.e., WBUF 710) of the ordered sequence of nodes. In the present case, the initial search space is determined to include the interconnection resources between the location to which the two nodes are assigned. Thus, the placer and router may determine the initial search space to include the switches at locations (0.5, 1.5) and (1.5, 1.5) and the physical links and channels that connect the switches with each other and with nearby physical units (i.e., PCUs and/or PMUs). For the remainder of this description, the search space is defined in terms of switches and their location. However, the search space also includes the physical links and channels that connect the switches with each other and with nearby physical units, even if this is not explicitly mentioned.

The placer and router may then determine legal shortest path routes on the reconfigurable processor in the search space for edge 743. In the present case, two equally long and legal shortest paths are determined: The first legal shortest path includes the switch at location (0.5, 1.5) and the physical links between this switch and nodes WBUF 710 at location (1, 2) and PCU1 720 at location (1, 1). The second legal shortest path includes the switch at location (1.5, 1.5) and the physical links between this switch and nodes WBUF 710 at location (1, 2) and PCU1 720 at location (1, 1). As shown in FIG. 9B, the placer and router has selected the first legal shortest path and assigned the edge 743 to the physical link from the PMU at location (1, 2) to the switch at location (0.5, 1.5) and the physical link from the switch at location (0.5, 1.5) to the PCU at location (1, 1). If desired, a tie-breaking unit may select between paths that have the same cost. For example, the tie-breaking unit may select paths that are closer to the periphery of the reconfigurable processor (e.g., by determining an average distance from the border of the reconfigurable processor) over paths that are further away from the periphery of the reconfigurable processor.

Figure 9C:
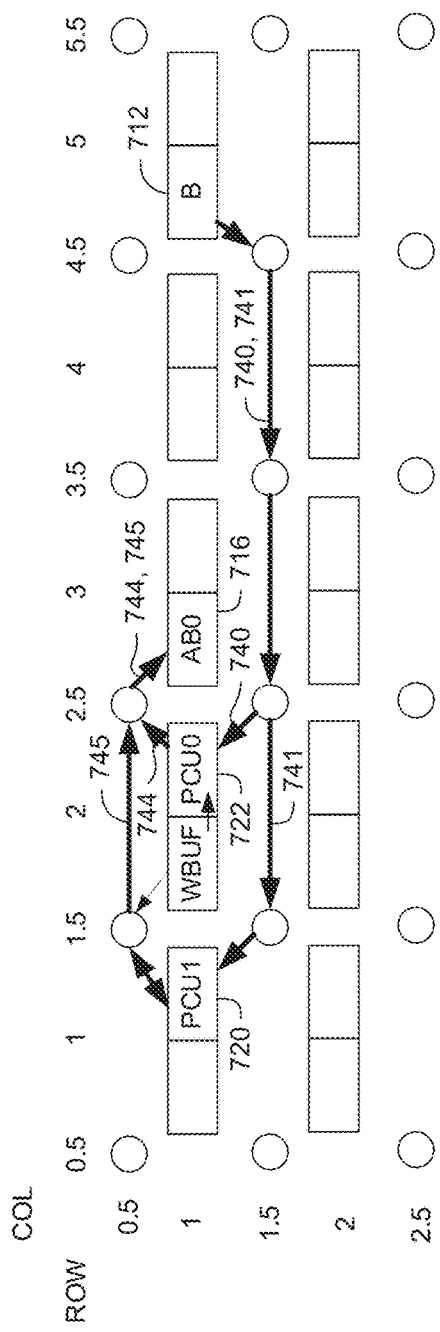
FIG. 9C is a diagram of an illustrative assignment of the first five nodes of the ordered sequence of nodes and the connections between these nodes of FIG. 9A onto a reconfigurable processor.

Since there are no edges-to-be-routed left, and the ordered sequence of nodes includes nine unassigned nodes, the placer and router may continue with the fourth iteration, which is illustratively shown in FIG. 9C.

In the fourth iteration, the placer and router may assign node B 712 as the first unassigned node from the ordered sequence of nodes as a currently assigned node to a location on the reconfigurable processor. For example, the placer and router may assign node B 712 as the currently assigned node to the PMU at location (1, 5).

Next, the placer and router may determine a search space on the reconfigurable processor for routing edges-to-be-routed of the edges. The edges-to-be-routed include edges 740 and 741 that connect the currently assigned node (i.e., B 712) with previously assigned nodes (i.e., PCU0 722 and PCU1 720) of the ordered sequence of nodes. In the present case, the initial search space is determined to include the interconnection resources between the locations to which the three nodes are assigned. Thus, the placer and router may determine the initial search space to include the switches at locations (0.5, 1.5), (0.5, 2.5), (0.5, 3.5), (0.5, 4.5), (1.5, 1.5), (1.5, 2.5), (1.5, 3.5), and (1.5, 4.5).

The placer and router may then determine legal shortest path routes on the reconfigurable processor in the search space for edges 740, 741. In the present case, the placer and router may determine a shortest-path tree starting from the PMU at location (1, 5). Since the physical link between the switch at location (0.5, 1.5) and PCU1 720 at location (1, 1) has a relative bandwidth usage of 1.0, PCU1 720 may only legally be reached within the search space from the switch at location (1.5, 1.5). Thus, any path from node B 712 at location (1, 5) via the switch at location (0.5, 4.5) is longer than the path from node B 712 at location (1, 5) via the switches at locations (1.5, 4.5), (1.5, 3.5), (1.5, 2.5), (1.5, 1.5) to node PCU1 720 at location (1, 1).

Since edges 740 and 741 are considered to transmit the same set of data from node B 712 to nodes PCU0 722 and PCU1 720, the shortest-path tree may re-use previously used interconnection resources that implement edge 741 when determining the interconnection resources for implementing the edge 740.

Thus, the legal shortest-path tree for the edges-to-be-routed in the current iteration includes the switches at locations (1.5, 1.5), (1.5, 2.5), (1.5, 3.5), and (1.5, 4.5) and the physical links between the switch at location (1.5, 4.5) and node B 712 at location (1, 5), between the switch at location (1.5, 1.5) and node PCU1 720 at location (1, 1), and between the switch at location (1.5, 2.5) and node PCU0 722 at location (1, 2). As shown in FIG. 9C, the placer and router has assigned the edges 740, 741 to the interconnection resources on the legal shortest-path tree.

Since all edges-to-be-routed have been assigned to interconnection resources, and the ordered sequence of nodes includes eight unassigned nodes, the placer and router may continue with the fifth iteration.

In the fifth iteration, the placer and router may assign node AB0 716 as the first unassigned node from the ordered sequence of nodes as a currently assigned node to a location on the reconfigurable processor. For example, the placer and router may assign node AB0 716 as the currently assigned node to the PMU at location (1, 3).

Next, the placer and router may determine a search space on the reconfigurable processor for routing edges-to-be-routed of the edges. The edges-to-be-routed include edges 744 and 745 that connect the currently assigned node (i.e., AB0 716) with previously assigned nodes (i.e., PCU0 722 and PCU1 720) of the ordered sequence of nodes. In the present case, the initial search space is determined to include the interconnection resources between the locations to which the three nodes are assigned. Thus, the placer and router may determine the initial search space to include the switches at locations (0.5, 1.5), (0.5, 2.5), (1.5, 1.5), and (1.5, 2.5).

The placer and router may then determine legal shortest path routes on the reconfigurable processor in the search space for edges 744, 745. In the present case, the placer and router may determine a shortest-path tree starting from the PCU at location (1, 1). Since every PCU can only send outputs to the switches that are to the northeast (NE) of the PCU, the placer and router determines that the legal shortest-path tree for the edges-to-be-routed in the current iteration includes the switches at locations (0.5, 1.5) and (0.5, 2.5) and the physical link that connects these switches as well as the physical links between the switch at location (0.5, 2.5) and node AB0 716 at location (1, 3), between the switch at location (0.5, 1.5) and node PCU1 720 at location (1, 1), and between the switch at location (0.5, 2.5) and node PCU0 722 at location (1, 2). As shown in FIG. 9C, the placer and router has assigned the edges 744, 745 to the interconnection resources on the legal shortest-path tree.

Figure 9D:
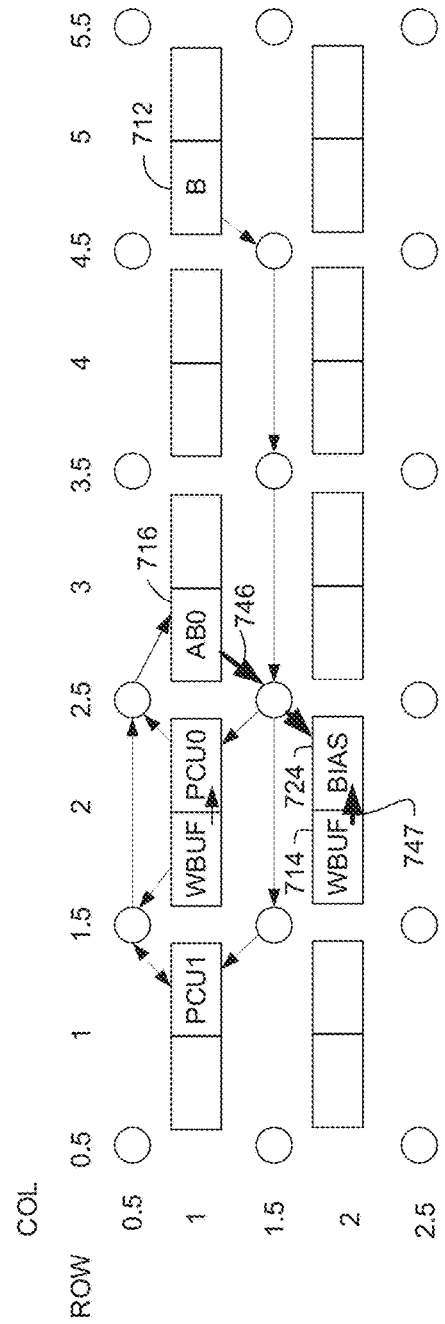
FIG. 9D is a diagram of an illustrative assignment of the first seven nodes of the ordered sequence of nodes and the connections between these nodes of FIG. 9A onto a reconfigurable processor.

Since all edges-to-be-routed have been assigned to interconnection resources, and the ordered sequence of nodes includes seven unassigned nodes, the placer and router may continue with the sixth iteration, which is illustratively shown in FIG. 9D.

In the sixth iteration, the placer and router may assign node BIAS 724 as the first unassigned node from the ordered sequence of nodes as a currently assigned node to a location on the reconfigurable processor. For example, the placer and router may assign node BIAS 724 as the currently assigned node to the PCU at location (2, 2).

Next, the placer and router may determine a search space on the reconfigurable processor for routing edges-to-be-routed. The edges-to-be-routed include edge 746 that connects the currently assigned node (i.e., BIAS 724) with previously assigned node (i.e., AB0 716) of the ordered sequence of nodes. In the present case, the initial search space is determined to include the interconnection resources between the locations to which the two nodes are assigned. Thus, the placer and router may determine the initial search space to include the switch at location (1.5, 2.5).

The placer and router may then determine a legal shortest path route on the reconfigurable processor in the search space for edge 746. In the present case, the placer and router may determine a legal shortest path starting from the PMU at location (1, 3) via the switch at location (1.5, 2.5) to the PCU at location (2, 2). As shown in FIG. 9D, the placer and router has assigned the edge 746 to the interconnection resources on the legal shortest path.

Since all edges-to-be-routed have been assigned to interconnection resources, and the ordered sequence of nodes includes six unassigned nodes, the placer and router may continue with the seventh iteration.

In the seventh iteration, the placer and router may assign node WBUF 714 as the first unassigned node from the ordered sequence of nodes as a currently assigned node to the PCU at location (2, 2) on the reconfigurable processor.

Next, the placer and router may determine a search space on the reconfigurable processor for routing edges-to-be-routed. The edges-to-be-routed include edge 747 that connects the currently assigned node (i.e., WBUF 714) with previously assigned node (i.e., BIAS 724). In the present case, the initial search space is determined to include the local connection inside the FCMU at location (2, 2). Since the local connection inside the FCMU represents a legal shortest path route for edge 747, edge 747 is assigned to the local connection as shown in FIG. 9D.

Figure 9E:
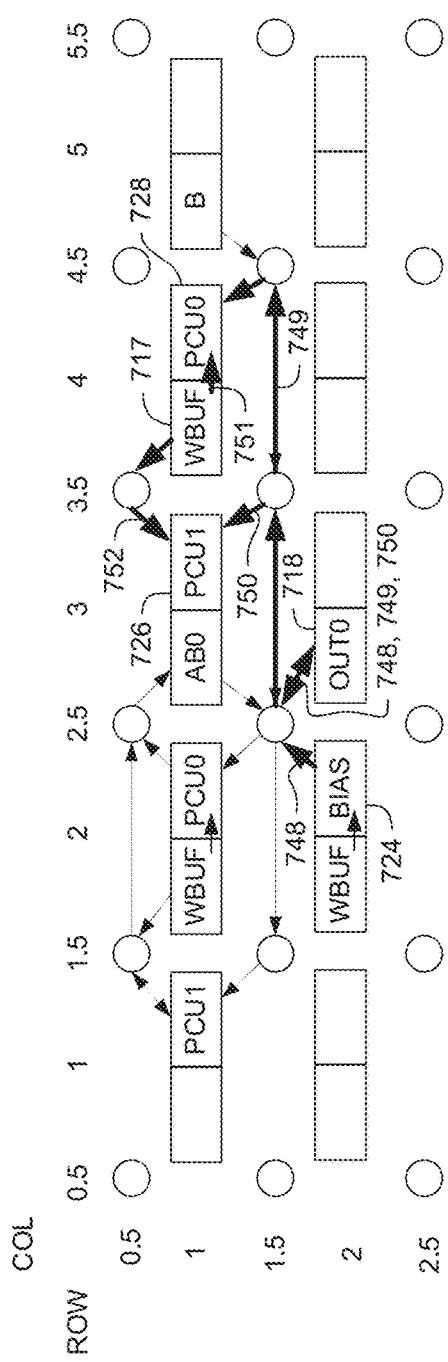
FIG. 9E is a diagram of an illustrative assignment of the first eleven nodes of the ordered sequence of nodes and the connections between these nodes of FIG. 9A onto a reconfigurable processor.

Since all edges-to-be-routed have been assigned to interconnection resources, and the ordered sequence of nodes includes five unassigned nodes, the placer and router may continue with the eighth iteration, which is illustratively shown in FIG. 9E.

In the eighth iteration, the placer and router may assign node OUT0 718 as the first unassigned node from the ordered sequence of nodes as a currently assigned node to a location on the reconfigurable processor. For example, the placer and router may assign node OUT0 718 as the currently assigned node to the PMU at location (2, 3).

Next, the placer and router may determine a search space on the reconfigurable processor for routing edges-to-be-routed. The edges-to-be-routed include edge 748 that connects the currently assigned node (i.e., OUT0 718) with previously assigned node (i.e., BIAS 724) of the ordered sequence of nodes. In the present case, the initial search space is determined to include the interconnection resources between the locations to which the two nodes are assigned. Thus, the placer and router may determine the initial search space to include the switches at locations (1.5, 2.5) and (2.5, 2.5).

The placer and router may then determine legal shortest path routes on the reconfigurable processor in the search space for edge 748. In the present case, the placer and router may determine a legal shortest path starting from the PCU at location (2, 2). Since every PCU can only send outputs to the switches that are to the northeast (NE) of the PCU, the placer and router determines that the legal shortest path for the edge 748 in the current iteration includes the switch at location (1.5, 2.5) and the physical links between the switch at location (1.5, 2.5) and node OUT0 718 at location (1, 3) and between the switch at location (1.5, 2.5) and node BIAS 724 at location (2, 2). As shown in FIG. 9E, the placer and router has assigned the edge 748 to the interconnection resources on the legal shortest path.

Since all edges-to-be-routed have been assigned to interconnection resources, and the ordered sequence of nodes includes four unassigned nodes, the placer and router may continue with the ninth iteration.

In the ninth iteration, the placer and router may assign node PCU0 728 as the first unassigned node from the ordered sequence of nodes as a currently assigned node to a location on the reconfigurable processor. For example, the placer and router may assign node PCU0 728 as the currently assigned node to the PCU at location (1, 4).

Next, the placer and router may determine a search space on the reconfigurable processor for routing edges-to-be-routed. The edges-to-be-routed include edge 749 that connects the currently assigned node (i.e., PCU0 728) with previously assigned node (i.e., OUT0 718) of the ordered sequence of nodes. In the present case, the initial search space is determined to include the interconnection resources between the locations to which the two nodes are assigned. Thus, the placer and router may determine the initial search space to include the switches at locations (1.5, 2.5), (1.5, 3.5), and (1.5, 4.5).

The placer and router may then determine legal shortest path routes on the reconfigurable processor in the search space for edge 749. In the present case, the placer and router may determine a legal shortest path that includes the switches at locations (1.5, 2.5), (1.5, 3.5), (1.5, 4.5) and the physical links between the switches, the switch at location (1.5, 2.5) and node OUT0 718 at location (2, 3) and between the switch at location (1.5, 4.5) and node PCU0 728 at location (1, 4). As shown in FIG. 9E, the placer and router has assigned the edge 749 to the interconnection resources on the legal shortest path.

Since all edges-to-be-routed have been assigned to interconnection resources, and the ordered sequence of nodes includes three unassigned nodes, the placer and router may continue with the tenth iteration.

In the tenth iteration, the placer and router may assign node PCU1 726 as the first unassigned node from the ordered sequence of nodes as a currently assigned node to a location on the reconfigurable processor. For example, the placer and router may assign node PCU1 726 as the currently assigned node to the PCU at location (1, 3).

Next, the placer and router may determine a search space on the reconfigurable processor for routing edges-to-be-routed. The edges-to-be-routed include edge 750 that connects the currently assigned node (i.e., PCU1 726) with previously assigned node (i.e., OUT0 718) of the ordered sequence of nodes. In the present case, the initial search space is determined to include the interconnection resources between the locations to which the two nodes are assigned. Thus, the placer and router may determine the initial search space to include the switches at locations (1.5, 2.5) and (1.5, 3.5).

The placer and router may then determine a legal shortest path route on the reconfigurable processor in the search space for edge 750. In the present case, the placer and router may extend the legal shortest path that was determined in the ninth iteration by adding the physical link between the switch at location (1.5, 3.5) and node PCU1 726 at location (1, 3). As shown in FIG. 9E, the placer and router has assigned the edge 750 to the interconnection resources on the legal shortest path.

Since all edges-to-be-routed have been assigned to interconnection resources, and the ordered sequence of nodes includes two unassigned nodes, the placer and router may continue with the eleventh iteration.

In the eleventh iteration, the placer and router may assign node WBUF 717 as the first unassigned node from the ordered sequence of nodes as a currently assigned node to the PMU at location (1, 4) on the reconfigurable processor.

Next, the placer and router may determine a search space on the reconfigurable processor for routing edges-to-be-routed. The edges-to-be-routed include edges 751 and 752 that connect the currently assigned node (i.e., WBUF 717) with previously assigned nodes (i.e., PCU0 728 and PCU1 726) of the ordered sequence of nodes. In the present case, the initial search space is determined to include the local connection inside the FCMU at location (4, 4) and the switches at location (0.5, 3.5) and (1.5, 3.5). Since the local connection inside the FCMU represents a legal shortest path route for edge 751, edge 751 is assigned to the local connection as shown in FIG. 9E.

The placer and router may further determine a legal shortest path for edge 752 that includes the switch at location (0.5, 3.5) and physical links between the switch and node PCU1 726 at location (1, 3) and between the switch and node WBUF 717 at location (1, 4). As shown in FIG. 9E, the placer and router has assigned the edge 752 to the interconnection resources on the legal shortest path.

Figure 9F:
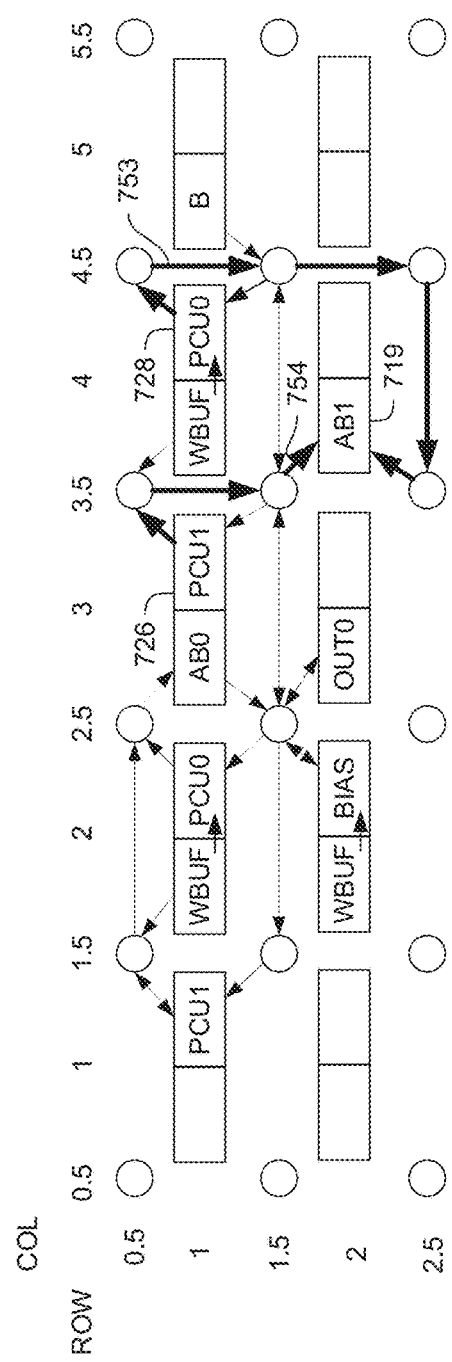
FIG. 9F is a diagram of an illustrative assignment of all twelve nodes of the ordered sequence of nodes and the connections between these nodes of FIG. 9A onto a reconfigurable processor.

Since all edges-to-be-routed have been assigned to interconnection resources, and the ordered sequence of nodes includes one unassigned node, the placer and router may continue with the twelfth iteration, which is illustratively shown in FIG. 9F.

In the twelfth iteration, the placer and router may assign node AB1 719 as the first unassigned node from the ordered sequence of nodes as a currently assigned node to a location on the reconfigurable processor. For example, the placer and router may assign node AB1 719 as the currently assigned node to the PMU at location (2, 4).

Next, the placer and router may determine a search space on the reconfigurable processor for routing edges-to-be-routed. The edges-to-be-routed include edges 753, 754 that connect the currently assigned node (i.e., AB1 719) with previously assigned nodes (i.e., PCU0 728 and PCU1 726) of the ordered sequence of nodes. In the present case, the initial search space is determined to include the interconnection resources between the locations to which the three nodes are assigned. Furthermore, since every PCU can only send outputs to the switches that are to the northeast (NE) of the PCU, the initial search space also includes the switches to the northeast of nodes PCU0 728 and PCU1 726. Thus, the placer and router may determine the initial search space to include the switches at locations (0.5, 3.5), (0.5, 4.5), (1.5, 3.5) and (1.5, 4.5).

The placer and router may then determine a legal shortest path route on the reconfigurable processor in the search space for edge 754. In the present case, the placer and router may determine the legal shortest path to include the switches at locations (0.5, 3.5) and (1.5, 3.5) as well as the physical links between these switches, between the switch at location (1.5, 3.5) and node AB1 719 at location (2, 4), and between the switch at location (0.5, 3.5) and node PCU1 726 at location (1, 3). As shown in FIG. 9E, the placer and router has assigned the edge 754 to the interconnection resources on the legal shortest path.

Since the edges 753 and 754 have a bandwidth requirement of 1.0 and transmit a different set of data to node AB1 719, edge 753 may not share a physical link with edge 754. Therefore, the placer and router fails to find a legal route in the initial search space.

In response to unsuccessfully determining a legal shortest path route for edge 753 in the search space, the placer and router may expand the search space. Illustratively, the placer and router may expand the search space by adding a predetermined number of switches around the current search space. In the present example, the placer and router may expand the search space by adding the switches at locations (0.5, 2.5), (1.5, 2.5), (2.5, 2.5), (2.5, 3.5), (2.5, 4.5), (2.5, 5.5), (1.5, 5.5), and (0.5, 5.5) as well as the channels and physical links that connect with these switches to the search space to form a new search space.

The placer and router may then return to determining the legal shortest path for edge 753 between PCU0 728 and AB1 719 in this new search space. Illustratively, the placer and router may determine the legal shortest path to include the switches at locations (0.5, 4.5), (1.5, 4.5), (2.5, 4.5), and (2.5, 3.5) as well as the physical links between these switches, between the switch at location (2.5, 3.5) and node AB1 719 at location (2, 4), and between the switch at location (0.5, 4.5) and node PCU0 728 at location (1, 4). As shown in FIG. 9E, the placer and router has assigned the edge 753 to the interconnection resources on the legal shortest path.

Since all edges-to-be-routed have been assigned to interconnection resources, and the ordered sequence of nodes includes no more unassigned nodes, the placer and router has completed placement and routing of the sorted operation unit graph on the reconfigurable processor. The placer and router terminates the operations.

Figure 10:
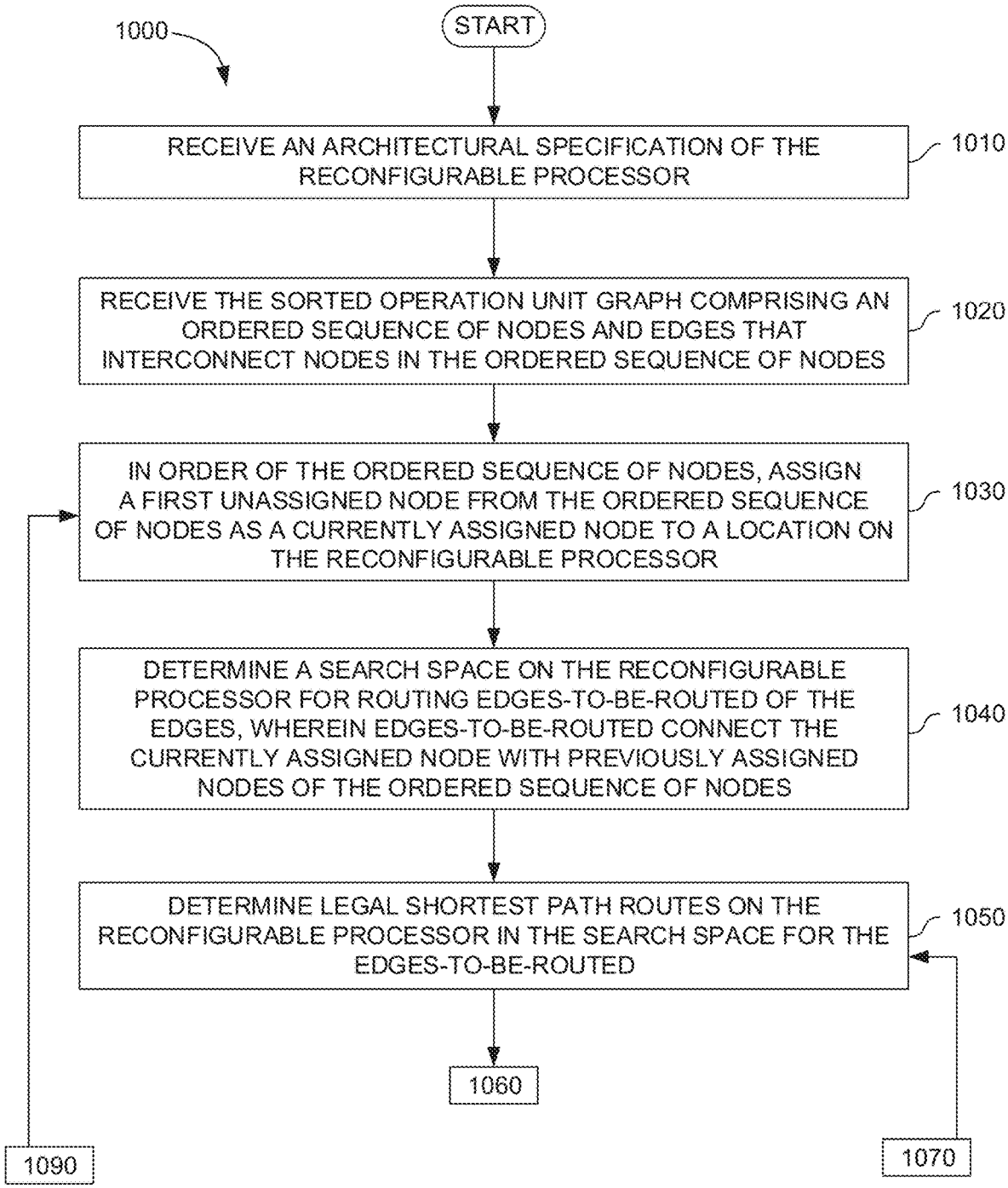
FIG. 10 is a first portion of a flowchart showing illustrative operations that a placer and router performs for an iterative placement and routing of a sorted operation unit graph on a reconfigurable processor.
Figure 10:
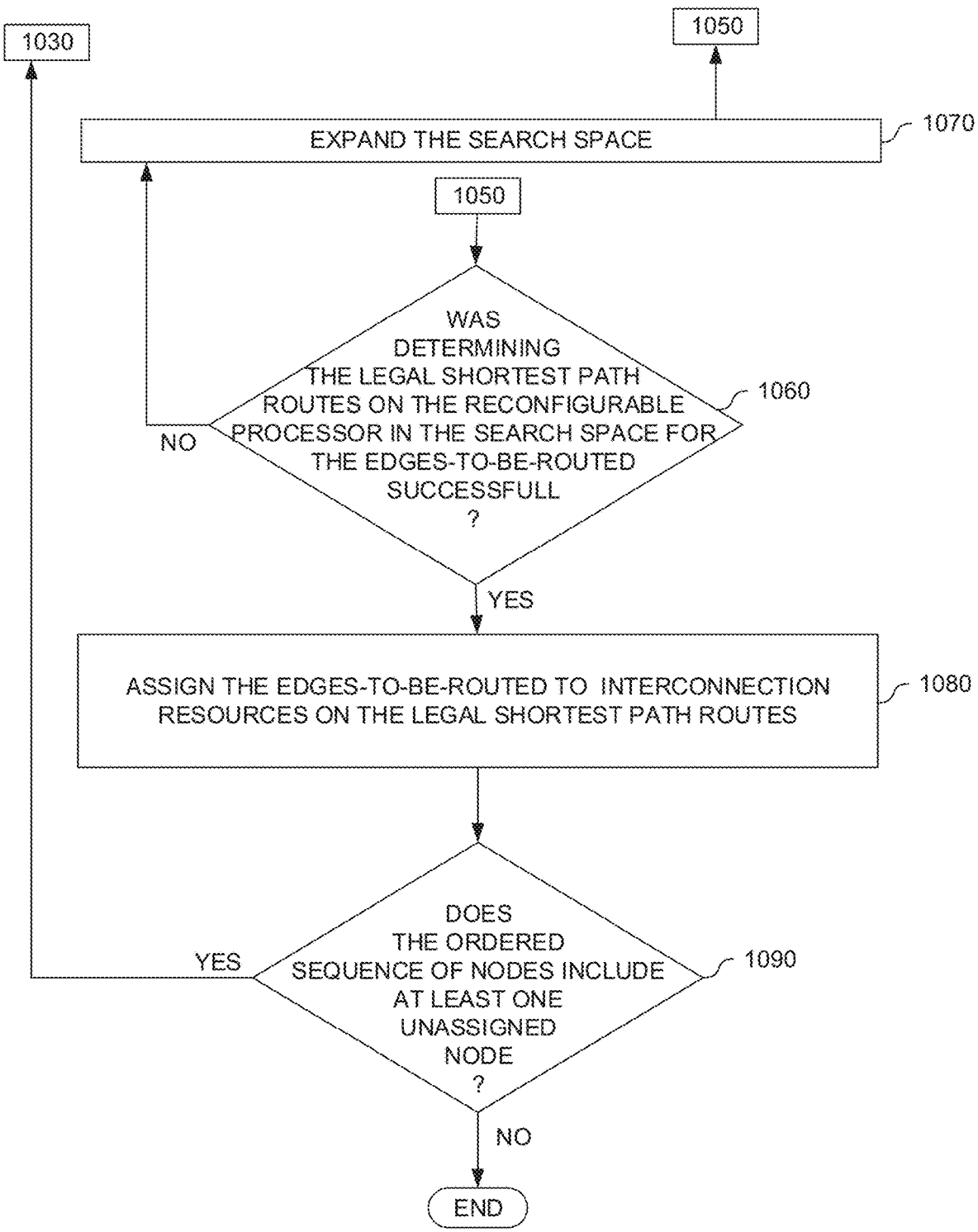

FIGS. 10 and 10' together show a flowchart 1000 of illustrative operations that a placer and router such as placer and router 870 of FIG. 8, performs for an iterative placement and routing of a sorted operation unit graph on a reconfigurable processor. Such a reconfigurable processor may include arrays of coarse-grained reconfigurable (CGR) units. In some implementations, the reconfigurable processor may be CGR processor 110 of FIG. 1. Illustratively, the reconfigurable processor may include interconnection resources.

During operation 1010, the placer and router receives an architectural specification of the reconfigurable processor. For example, the placer and router 870 of FIG. 8 may receive architectural specification 860. The architectural specifications may include the locations of physical units. These physical units may include computational units such as PCUs and memory units such as PMUs. The architectural specification may include the location, capacity, and connectivity of interconnection resources such as switches, physical links between the switches, and physical links between the switches and the physical units. In some implementations, the architectural specification may include routing limitations such as every PCU may only receive inputs from the attached PMU or from the switches that are to the northeast (NE) or southeast (SE) of the PCU, or every PCU can only send outputs to the switches that are to the northeast (NE) of the PCU, or every PMU can only receive inputs from the switches that are to the NW or SW of the PMU, or every PMU can only send outputs to the attached PCU or to the switches that are to the NW or SW of the PMU, etc.

During operation 1020, the placer and router receives the sorted operation unit graph having an ordered sequence of nodes and edges that interconnect nodes in the ordered sequence of nodes. For example, the placer and router may receive the sorted operation unit graph of FIG. 9A, which has an ordered sequence of nodes and edges that interconnect nodes in the ordered sequence of nodes. If desired, the nodes in the ordered sequence of nodes are ordered based on a usage of the interconnection resources for implementing the edges that interconnect the nodes.

During operation 1030, the placer and router assigns, in order of the ordered sequence of nodes, a first unassigned node from the ordered sequence of nodes as a currently assigned node to a location on the reconfigurable processor. For example, after having assigned node WBUF 710 of the sorted operation unit graph 700 of FIG. 9A to location (1, 2), the placer and router may assign node PCU0 722 as the first unassigned nodes from the ordered sequence of nodes of FIG. 9A to location (1, 2) on the reconfigurable processor as shown in FIG. 9B.

During operation 1040, the placer and router determines a search space on the reconfigurable processor for routing edges-to-be-routed of the edges, wherein the edges-to-be-routed connect the currently assigned node with previously assigned nodes of the ordered sequence of nodes. As an example, the search space may include a smallest connected area on the reconfigurable processor that includes the currently assigned node and the previously assigned nodes of the ordered sequence of nodes that are connected via the edges-to-be-routed with the currently assigned node. If desired, the smallest connected area may be a rectangular bounding box.

During operation 1050, the placer and router determines legal shortest path routes on the reconfigurable processor in the search space for the edges-to-be-routed. For example, the placer and router may, for each edge of the edges-to-be-routed, determine a legal shortest-path tree that implements the edge using the interconnection resources on the reconfigurable processor. Each one of the interconnection resources may have an associated valuation, such that the legal shortest-path tree has an associated total valuation, and any other legal tree that implements the edge using the interconnection resources in the search space has a worse associated total valuation than the legal shortest-path tree. Illustratively, the associated valuation of each one of the interconnection resources comprises a cost function that is based on a sum of current bandwidths of the interconnection resources.

In some implementations, the placer and router may determine whether a previously assigned node of the previously assigned nodes is a source node of the edge. In response to determining that the previously assigned node is the source node of the edge, the placer and router may determine the legal shortest-path tree that implements the edge using the interconnection resources on the reconfigurable processor by starting from the previously assigned node of the ordered sequence of nodes. If desired, previously used interconnection resources that implement portions of the edge between the previously assigned node and other ones of the previously assigned nodes may be considered part of the previously assigned node.

In other implementations, the placer and router may determine whether the currently assigned node is a source node of the edge. In response to determining that the currently assigned node is the source node of the edge, the placer and router may determine the legal shortest-path tree that implements the edge using the interconnection resources on the reconfigurable processor by starting from the currently assigned node. If desired, previously used interconnection resources that implement portions of the edge between the currently assigned node and other ones of the previously assigned nodes may be considered part of the currently assigned node.

During operation 1060, the placer and router checks whether determining the legal shortest path routes on the reconfigurable processor in the search space for the edges-to-be-routed was successful.

In response to unsuccessfully determining the legal shortest path routes on the reconfigurable processor in the search space for the edges-to-be-routed, the placer and router expands the search space during operation 1070. For example, interconnection resources on the reconfigurable processor are arranged in rows and columns, and the placer and router may expand the search space in positive horizontal direction by a first predetermined number of columns, expand the search space in negative horizontal direction by a second predetermined number of columns, expand the search space in positive vertical direction by a first predetermined number of rows, and/or expand the search space in negative vertical direction by a second predetermined number of rows. After having expanded the search space, the placer and router may return to operation 1050 with the new expanded search space being the search space in which the placer and router determines legal shortest path routes for the edges-to-be-routed.

In response to successfully determining the legal shortest path routes on the reconfigurable processor in the search space for the edges-to-be-routed, the placer and router assigns the edges-to-be-routed to interconnections resources on the legal shortest path routes during operation 1080.

During operation 1090, the placer and router may determine whether the ordered sequence of nodes includes at least one unassigned node. In response to determining that the ordered sequence of nodes includes at least one unassigned node, the placer and router returns to operation 1030. Otherwise, the placer and router terminates.

If desired, a non-transitory computer-readable storage medium includes instructions that, when executed by a processing unit (e.g., host processor 180 of FIG. 1), cause the processing unit to operate a placer and router (e.g., placer and router 625 of FIG. 6 or the placer and router 870 of FIG. 8) for an iterative placement and routing of a sorted operation unit graph on a reconfigurable processor by performing operations 1010 to 1080 of FIGS. 10 and 10'.

The instructions may include receiving an architectural specification of the reconfigurable processor, receiving the sorted operation unit graph having an ordered sequence of nodes and edges that interconnect nodes in the ordered sequence of nodes, and repeating as long as the ordered sequence of nodes comprises at least one unassigned node: in order of the ordered sequence of nodes, assigning a first unassigned node from the ordered sequence of nodes as a currently assigned node to a location on the reconfigurable processor, determining a search space on the reconfigurable processor for routing edges-to-be-routed of the edges, wherein the edges-to-be-routed connect the currently assigned node with previously assigned nodes of the ordered sequence of nodes, determining legal shortest path routes on the reconfigurable processor in the search space for the edges-to-be-routed, in response to unsuccessfully determining the legal shortest path routes on the reconfigurable processor in the search space for the edges-to-be-routed: expanding the search space, and returning to determining the legal shortest path routes on the reconfigurable processor in the search space for the edges-to-be-routed, in response to successfully determining the legal shortest path routes on the reconfigurable processor in the search space for the edges-to-be-routed: assigning the edges-to-be-routed to interconnection resources on the legal shortest path routes.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or micro-code. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a method of operating a placer and router for an iterative placement and routing of a sorted operation unit graph on a reconfigurable processor, comprising: receiving an architectural specification of the reconfigurable processor; receiving the sorted operation unit graph having an ordered sequence of nodes and edges that interconnect nodes in the ordered sequence of nodes; repeating as long as the ordered sequence of nodes comprises at least one unassigned node: in order of the ordered sequence of nodes, assigning a first unassigned node from the ordered sequence of nodes as a currently assigned node to a location on the reconfigurable processor; determining a search space on the reconfigurable processor for routing edges-to-be-routed of the edges, wherein the edges-to-be-routed connect the currently assigned node with previously assigned nodes of the ordered sequence of nodes; determining legal shortest path routes on the reconfigurable processor in the search space for the edges-to-be-routed; in response to unsuccessfully determining the legal shortest path routes on the reconfigurable processor in the search space for the edges-to-be-routed: expanding the search space, and returning to determining the legal shortest path routes on the reconfigurable processor in the search space for the edges-to-be-routed; in response to successfully determining the legal shortest path routes on the reconfigurable processor in the search space for the edges-to-be-routed: assigning the edges-to-be-routed to interconnection resources on the legal shortest path routes.

In Example 2, the reconfigurable processor of Example 1 comprises arrays of coarse-grained reconfigurable (CGR) units.

In Example 3, the interconnection resources of Example 1 comprise switches, first physical links between the switches, and second physical links between the switches and physical units.

In Example 4, the nodes in the ordered sequence of nodes of Example 1 are ordered based on a usage of the interconnection resources for implementing the edges that interconnect the nodes.

In Example 5, the search space of Example 1 includes a smallest connected area on the reconfigurable processor that includes the currently assigned node and the previously assigned nodes of the ordered sequence of nodes that are connected via the edges-to-be-routed with the currently assigned node.

In Example 6, the smallest connected area of Example 5 is a rectangular bounding box.

In Example 7, determining the legal shortest path routes on the reconfigurable processor in the search space for the edges-to-be-routed of Example 1 further comprises: for each edge of the edges-to-be-routed, determining a legal shortest-path tree that implements the edge using the interconnection resources on the reconfigurable processor, wherein each one of the interconnection resources has an associated valuation, wherein the legal shortest-path tree has an associated total valuation, and wherein any other legal tree that implements the edge using the interconnection resources in the search space has a worse associated total valuation than the legal shortest-path tree.

In Example 8, determining the legal shortest-path tree that implements the edge using the interconnection resources on the reconfigurable processor of Example 7 further comprises: determining whether a previously assigned node of the previously assigned nodes is a source node of the edge; and in response to determining that the previously assigned node is the source node of the edge, determining the legal shortest-path tree that implements the edge using the interconnection resources on the reconfigurable processor by starting from the previously assigned node of the ordered sequence of nodes.

In Example 9, determining the legal shortest-path tree of Example 8 that implements the edge using the interconnection resources on the reconfigurable processor by starting from the previously assigned node of the ordered sequence of nodes further comprises: previously used interconnection resources that implement portions of the edge between the previously assigned node and other ones of the previously assigned nodes are considered part of the previously assigned node.

In Example 10, determining the legal shortest-path tree of Example 7 that implements the edge using the interconnection resources on the reconfigurable processor further comprises: determining whether the currently assigned node is a source node of the edge; and in response to determining that the currently assigned node is the source node of the edge, determining the legal shortest-path tree that implements the edge using the interconnection resources on the reconfigurable processor by starting from the currently assigned node.

In Example 11, determining the legal shortest-path tree of Example 10 that implements the edge using the interconnection resources on the reconfigurable processor by starting from the currently assigned node further comprises: previously used interconnection resources that implement portions of the edge between the currently assigned node and other ones of the previously assigned nodes are considered part of the currently assigned node.

In Example 12, the associated valuation of each one of the interconnection resources of Example 7 comprises a cost function that is based on a sum of current bandwidths of the interconnection resources.

In Example 13, interconnection resources on the reconfigurable processor of Example 1 are arranged in rows and columns, and wherein expanding the search space further comprises: expanding the search space in positive horizontal direction by a first predetermined number of columns; expanding the search space in negative horizontal direction by a second predetermined number of columns; expanding the search space in positive vertical direction by a first predetermined number of rows; and/or expanding the search space in negative vertical direction by a second predetermined number of rows.

Example 14 is a placer and router for an iterative placement and routing of a sorted operation unit graph on a reconfigurable processor, wherein the placer and router is configured to: receive an architectural specification of the reconfigurable processor; receive the sorted operation unit graph having an ordered sequence of nodes and edges that interconnect nodes in the ordered sequence of nodes; repeat as long as the ordered sequence of nodes comprises at least one unassigned node: in order of the ordered sequence of nodes, assign a first unassigned node from the ordered sequence of nodes as a currently assigned node to a location on the reconfigurable processor; determine a search space on the reconfigurable processor for routing edges-to-be-routed of the edges, wherein the edges-to-be-routed connect the currently assigned node with previously assigned nodes of the ordered sequence of nodes; determine legal shortest path routes on the reconfigurable processor in the search space for the edges-to-be-routed; in response to unsuccessfully determining the legal shortest path routes on the reconfigurable processor in the search space for the edges-to-be-routed: expand the search space, and return to determining the legal shortest path routes on the reconfigurable processor in the search space for the edges-to-be-routed; in response to successfully determining the legal shortest path routes on the reconfigurable processor in the search space for the edges-to-be-routed: assign the edges-to-be-routed to interconnection resources on the legal shortest path routes.

In Example 15, for determining the legal shortest path routes on the reconfigurable processor in the search space for the edges-to-be-routed, the placer and router of Example 14 is further configured to: for each edge of the edges-to-be-routed, determine a legal shortest-path tree that implements the edge using the interconnection resources on the reconfigurable processor, wherein each one of the interconnection resources has an associated valuation, wherein the legal shortest-path tree has an associated total valuation, and wherein any other tree that implements the edge using the interconnection resources in the search space has a worse associated total valuation than the legal shortest-path tree.

In Example 16, for determining the legal shortest-path tree that implements the edge using the interconnection resources on the reconfigurable processor, the placer and router of Example 15 is further configured to: determine whether a previously assigned node of the previously assigned nodes of the ordered sequence of nodes is a source node of the edge; and in response to determining that the previously assigned node is the source node of the edge, determine the legal shortest-path tree that implements the edge between the previously assigned node and the currently assigned node using the interconnection resources on the reconfigurable processor by starting from the previously assigned node of the ordered sequence of nodes.

In Example 17, for determining the legal shortest-path tree that implements the edge using the interconnection resources on the reconfigurable processor, the placer and router of Example 15 is further configured to: determine whether the currently assigned node is a source node of the edge; and in response to determining that the currently assigned node is the source node of the edge, determine the legal shortest-path tree that implements the edge using the interconnection resources on the reconfigurable processor by starting from the currently assigned node.

In Example 18, the associated valuation of each one of the interconnection resources of Example 15 comprises a cost function that is based on a sum of current bandwidths of the interconnection resources.

In Example 19, interconnection resources on the reconfigurable processor are arranged in rows and columns, and wherein, for expanding the search space, the placer and router of Example 14 is further configured to: expand the search space in positive horizontal direction by a first predetermined number of columns; expand the search space in negative horizontal direction by a second predetermined number of columns; expand the search space in positive vertical direction by a first predetermined number of rows; and/or expand the search space in negative vertical direction by a second predetermined number of rows.

Example 20 is a non-transitory computer-readable storage medium including instructions that, when executed by a processing unit, cause the processing unit to operate a placer and router for an iterative placement and routing of a sorted operation unit graph on a reconfigurable processor, the instructions comprising: receiving an architectural specification of the reconfigurable processor; receiving the sorted operation unit graph having an ordered sequence of nodes and edges that interconnect nodes in the ordered sequence of nodes; repeating as long as the ordered sequence of nodes comprises at least one unassigned node: in order of the ordered sequence of nodes, assigning a first unassigned node from the ordered sequence of nodes as a currently assigned node to a location on the reconfigurable processor; determining a search space on the reconfigurable processor for routing edges-to-be-routed of the edges, wherein the edges-to-be-routed connect the currently assigned node with previously assigned nodes of the ordered sequence of nodes; determining legal shortest path routes on the reconfigurable processor in the search space for the edges-to-be-routed; in response to unsuccessfully determining the legal shortest path routes on the reconfigurable processor in the search space for the edges-to-be-routed: expanding the search space, and returning to determining the legal shortest path routes on the reconfigurable processor in the search space for the edges-to-be-routed; in response to successfully determining the legal shortest path routes on the reconfigurable processor in the search space for the edges-to-be-routed: assigning the edges-to-be-routed to interconnection resources on the legal shortest path routes.

What is claimed is:

1. A method of operating a placer and router for an iterative placement and routing of a sorted operation unit graph on a reconfigurable processor, comprising:
   receiving an architectural specification of the reconfigurable processor;
   receiving the sorted operation unit graph comprising an ordered sequence of nodes and edges that interconnect nodes in the ordered sequence of nodes;

repeating as long as the ordered sequence of nodes comprises at least one unassigned node:
  in order of the ordered sequence of nodes, assigning a first unassigned node from the ordered sequence of nodes as a currently assigned node to a location on the reconfigurable processor;
  determining a search space on the reconfigurable processor for routing edges-to-be-routed of the edges, wherein the edges-to-be-routed connect the currently assigned node with previously assigned nodes of the ordered sequence of nodes;
  determining legal shortest path routes on the reconfigurable processor in the search space for the edges-to-be-routed;
  in response to unsuccessfully determining the legal shortest path routes on the reconfigurable processor in the search space for the edges-to-be-routed:
    expanding the search space, and
    returning to determining the legal shortest path routes on the reconfigurable processor in the search space for the edges-to-be-routed;
  in response to successfully determining the legal shortest path routes on the reconfigurable processor in the search space for the edges-to-be-routed:
    assigning the edges-to-be-routed to interconnection resources on the legal shortest path routes.

2. The method of claim 1, wherein the reconfigurable processor comprises arrays of coarse-grained reconfigurable (CGR) units.

3. The method of claim 1, wherein the interconnection resources comprise switches, first physical links between the switches, and second physical links between the switches and physical units.

4. The method of claim 1, wherein the nodes in the ordered sequence of nodes are ordered based on a usage of the interconnection resources for implementing the edges that interconnect the nodes.

5. The method of claim 1, wherein the search space includes a smallest connected area on the reconfigurable processor that includes the currently assigned node and the previously assigned nodes of the ordered sequence of nodes that are connected via the edges-to-be-routed with the currently assigned node.

6. The method of claim 5, wherein the smallest connected area is a rectangular bounding box.

7. The method of claim 1, wherein determining the legal shortest path routes on the reconfigurable processor in the search space for the edges-to-be-routed further comprises:
  for each edge of the edges-to-be-routed, determining a legal shortest-path tree that implements the edge using the interconnection resources on the reconfigurable processor, wherein each one of the interconnection resources has an associated valuation, wherein the legal shortest-path tree has an associated total valuation, and wherein any other legal tree that implements the edge using the interconnection resources in the search space has a worse associated total valuation than the legal shortest-path tree.

8. The method of claim 7, wherein determining the legal shortest-path tree that implements the edge using the interconnection resources on the reconfigurable processor further comprises:
  determining whether a previously assigned node of the previously assigned nodes is a source node of the edge; and
  in response to determining that the previously assigned node is the source node of the edge, determining the legal shortest-path tree that implements the edge using the interconnection resources on the reconfigurable processor by starting from the previously assigned node of the ordered sequence of nodes.

9. The method of claim 8, wherein determining the legal shortest-path tree that implements the edge using the interconnection resources on the reconfigurable processor by starting from the previously assigned node of the ordered sequence of nodes further comprises:
  previously used interconnection resources that implement portions of the edge between the previously assigned node and other ones of the previously assigned nodes are considered part of the previously assigned node.

10. The method of claim 7, wherein determining the legal shortest-path tree that implements the edge using the interconnection resources on the reconfigurable processor further comprises:
  determining whether the currently assigned node is a source node of the edge; and
  in response to determining that the currently assigned node is the source node of the edge, determining the legal shortest-path tree that implements the edge using the interconnection resources on the reconfigurable processor by starting from the currently assigned node.

11. The method of claim 10, wherein determining the legal shortest-path tree that implements the edge using the interconnection resources on the reconfigurable processor by starting from the currently assigned node further comprises:
  previously used interconnection resources that implement portions of the edge between the currently assigned node and other ones of the previously assigned nodes are considered part of the currently assigned node.

12. The method of claim 7, wherein the associated valuation of each one of the interconnection resources comprises a cost function that is based on a sum of current bandwidths of the interconnection resources.

13. The method of claim 1, wherein interconnection resources on the reconfigurable processor are arranged in rows and columns, and wherein expanding the search space further comprises:
  expanding the search space in positive horizontal direction by a first predetermined number of columns;
  expanding the search space in negative horizontal direction by a second predetermined number of columns;
  expanding the search space in positive vertical direction by a first predetermined number of rows; and/or
  expanding the search space in negative vertical direction by a second predetermined number of rows.

14. A placer and router for an iterative placement and routing of a sorted operation unit graph on a reconfigurable processor, wherein the placer and router is configured to:
  receive an architectural specification of the reconfigurable processor;
  receive the sorted operation unit graph comprising an ordered sequence of nodes and edges that interconnect nodes in the ordered sequence of nodes;
  repeat as long as the ordered sequence of nodes comprises at least one unassigned node:
    in order of the ordered sequence of nodes, assign a first unassigned node from the ordered sequence of nodes as a currently assigned node to a location on the reconfigurable processor;
    determine a search space on the reconfigurable processor for routing edges-to-be-routed of the edges, wherein the edges-to-be-routed connect the currently assigned node with previously assigned nodes of the ordered sequence of nodes;

determine legal shortest path routes on the reconfigurable processor in the search space for the edges-to-be-routed;

in response to unsuccessfully determining the legal shortest path routes on the reconfigurable processor in the search space for the edges-to-be-routed:
 expand the search space, and
 return to determining the legal shortest path routes on the reconfigurable processor in the search space for the edges-to-be-routed;

in response to successfully determining the legal shortest path routes on the reconfigurable processor in the search space for the edges-to-be-routed:
 assign the edges-to-be-routed to interconnection resources on the legal shortest path routes.

15. The placer and router of claim 14, wherein, for determining the legal shortest path routes on the reconfigurable processor in the search space for the edges-to-be-routed, the placer and router is further configured to:

for each edge of the edges-to-be-routed, determine a legal shortest-path tree that implements the edge using the interconnection resources on the reconfigurable processor, wherein each one of the interconnection resources has an associated valuation, wherein the legal shortest-path tree has an associated total valuation, and wherein any other tree that implements the edge using the interconnection resources in the search space has a worse associated total valuation than the legal shortest-path tree.

16. The placer and router of claim 15, wherein, for determining the legal shortest-path tree that implements the edge using the interconnection resources on the reconfigurable processor, the placer and router is further configured to:

determine whether a previously assigned node of the previously assigned nodes of the ordered sequence of nodes is a source node of the edge; and in response to determining that the previously assigned node is the source node of the edge, determine the legal shortest-path tree that implements the edge between the previously assigned node and the currently assigned node using the interconnection resources on the reconfigurable processor by starting from the previously assigned node of the ordered sequence of nodes.

17. The placer and router of claim 15, wherein, for determining the legal shortest-path tree that implements the edge using the interconnection resources on the reconfigurable processor, the placer and router is further configured to:

determine whether the currently assigned node is a source node of the edge; and in response to determining that the currently assigned node is the source node of the edge, determine the legal shortest-path tree that implements the edge using the interconnection resources on the reconfigurable processor by starting from the currently assigned node.

18. The placer and router of claim 15, wherein the associated valuation of each one of the interconnection resources comprises a cost function that is based on a sum of current bandwidths of the interconnection resources.

19. The placer and router of claim 14, wherein interconnection resources on the reconfigurable processor are arranged in rows and columns, and wherein, for expanding the search space, the placer and router is further configured to:

expand the search space in positive horizontal direction by a first predetermined number of columns;

expand the search space in negative horizontal direction by a second predetermined number of columns;

expand the search space in positive vertical direction by a first predetermined number of rows; and/or expand the search space in negative vertical direction by a second predetermined number of rows.

20. A non-transitory computer-readable storage medium including instructions that, when executed by a processing unit, cause the processing unit to operate a placer and router for an iterative placement and routing of a sorted operation unit graph on a reconfigurable processor, the instructions comprising:

receiving an architectural specification of the reconfigurable processor;

receiving the sorted operation unit graph comprising an ordered sequence of nodes and edges that interconnect nodes in the ordered sequence of nodes;

repeating as long as the ordered sequence of nodes comprises at least one unassigned node:
 in order of the ordered sequence of nodes, assigning a first unassigned node from the ordered sequence of nodes as a currently assigned node to a location on the reconfigurable processor;
 determining a search space on the reconfigurable processor for routing edges-to-be-routed of the edges, wherein the edges-to-be-routed connect the currently assigned node with previously assigned nodes of the ordered sequence of nodes;
 determining legal shortest path routes on the reconfigurable processor in the search space for the edges-to-be-routed;
 in response to unsuccessfully determining the legal shortest path routes on the reconfigurable processor in the search space for the edges-to-be-routed:
  expanding the search space, and
  returning to determining the legal shortest path routes on the reconfigurable processor in the search space for the edges-to-be-routed;
 in response to successfully determining the legal shortest path routes on the reconfigurable processor in the search space for the edges-to-be-routed:
  assigning the edges-to-be-routed to interconnection resources on the legal shortest path routes.

* * * * *